(12) United States Patent
Xaypanya et al.

(10) Patent No.: US 9,332,028 B2
(45) Date of Patent: May 3, 2016

(54) SYSTEM, METHOD, AND APPARATUS FOR PROVIDING NETWORK SECURITY

(71) Applicant: REMTCS Inc., Red Bank, NJ (US)

(72) Inventors: Tommy Xaypanya, Lamar, MS (US); Richard E. Malinowski, Colts Neck, NJ (US)

(73) Assignee: REMTCS Inc., Red Bank, NJ (US)

( * ) Notice: Subject to any disclaimer, the term of this patent is extended or adjusted under 35 U.S.C. 154(b) by 0 days.

(21) Appl. No.: 14/163,186

(22) Filed: Jan. 24, 2014

(65) Prior Publication Data

US 2014/0215621 A1 Jul. 31, 2014

Related U.S. Application Data

(60) Provisional application No. 61/756,573, filed on Jan. 25, 2013, provisional application No. 61/794,430, filed on Mar. 15, 2013, provisional application No. 61/794,472, filed on Mar. 15, 2013, provisional application No. 61/794,505, filed on Mar. 15, 2013, provisional application No. 61/794,547, filed on Mar. 15, 2013, provisional application No. 61/891,598, filed on Oct. 16, 2013, provisional application No. 61/897,745, filed on Oct. 30, 2013.

(51) Int. Cl.
*H04L 29/06* (2006.01)

(52) U.S. Cl.
CPC .................. *H04L 63/145* (2013.01)

(58) Field of Classification Search
CPC ... G06F 21/53; G06F 9/45504; G06F 21/566; G06F 2201/865; G06F 9/45516; G06F 9/45533; G06F 9/45558; G06F 21/56; H04L 63/145

USPC ...................................................... 726/22–24
See application file for complete search history.

(56) References Cited

U.S. PATENT DOCUMENTS

| | | | |
|---|---|---|---|
| 5,825,906 A | 10/1998 | Obata et al. | |
| 6,357,008 B1 * | 3/2002 | Nachenberg | 726/24 |
| 7,321,883 B1 | 1/2008 | Freedy et al. | |
| 7,891,004 B1 | 2/2011 | Gelvin et al. | |
| 8,042,180 B2 * | 10/2011 | Gassoway | H04L 12/2602 726/22 |

(Continued)

FOREIGN PATENT DOCUMENTS

WO WO 2013/147903 10/2013

OTHER PUBLICATIONS

M. Alazab, S. Venkatraman, P. Watters, M. Alazab: "Zero-day malware detection based on supervised learning algorithms of API call signatures", 9th Autralian Data Mining Conference, Australian Computer Society, 2011, Balarat, Australia, pp. 171-182.*

(Continued)

*Primary Examiner* — Catherine Thiaw
(74) *Attorney, Agent, or Firm* — Sheridan Ross P.C.

(57) ABSTRACT

Methods, systems, and apparatuses for proactively protecting a computing network are disclosed. A proactive security mechanism is disclosed, among other things, with the ability to monitor a protected domain in real-time and safely identify inoculation procedures for responding to threats introduced to the protected domain via malware. The proactive security mechanism includes an Artificial Neural Network Interface (ANNI) configured to execute at least some features of the proactive security mechanism.

18 Claims, 8 Drawing Sheets

(56) References Cited

U.S. PATENT DOCUMENTS

| | | | |
|---|---|---|---|
| 8,584,242 B2* | 11/2013 | Lagar-Cavilla | G06F 21/566 726/24 |
| 8,812,868 B2* | 8/2014 | Blaisdell et al. | 713/189 |
| 8,918,881 B2* | 12/2014 | Bettini et al. | 726/24 |
| 2002/0162015 A1 | 10/2002 | Tang | |
| 2005/0050336 A1 | 3/2005 | Liang et al. | |
| 2005/0198242 A1 | 9/2005 | Kim | |
| 2005/0267911 A1 | 12/2005 | Kamath et al. | |
| 2005/0268338 A1* | 12/2005 | Made | 726/24 |
| 2006/0026675 A1* | 2/2006 | Cai et al. | 726/22 |
| 2008/0016570 A1* | 1/2008 | Capalik | 726/23 |
| 2008/0040801 A1 | 2/2008 | Buriano et al. | |
| 2008/0184371 A1* | 7/2008 | Moskovitch | G06F 21/566 726/24 |
| 2009/0089879 A1 | 4/2009 | Wang et al. | |
| 2009/0165137 A1* | 6/2009 | Yoo et al. | 726/24 |
| 2009/0172816 A1 | 7/2009 | Maino et al. | |
| 2009/0300589 A1* | 12/2009 | Watters et al. | 717/140 |
| 2010/0138925 A1 | 6/2010 | Barai et al. | |
| 2010/0153315 A1 | 6/2010 | Gao et al. | |
| 2011/0235650 A1 | 9/2011 | Martinez et al. | |
| 2011/0258701 A1 | 10/2011 | Cruz et al. | |
| 2012/0215728 A1* | 8/2012 | Isaiadis | 706/25 |
| 2012/0240185 A1* | 9/2012 | Kapoor et al. | 726/1 |
| 2012/0284699 A1 | 11/2012 | Van Der Merwe et al. | |
| 2013/0014261 A1 | 1/2013 | Millliken et al. | |
| 2013/0055246 A1 | 2/2013 | Li et al. | |
| 2013/0097704 A1* | 4/2013 | Gavrilut et al. | 726/23 |
| 2013/0097706 A1* | 4/2013 | Titonis et al. | 726/24 |
| 2013/0117006 A1* | 5/2013 | Varghese et al. | 703/22 |
| 2013/0145065 A1 | 6/2013 | Ricci | |
| 2013/0145482 A1 | 6/2013 | Ricci et al. | |
| 2013/0232576 A1* | 9/2013 | Karnikis et al. | 726/24 |
| 2013/0332026 A1 | 12/2013 | McKown et al. | |
| 2013/0347052 A1* | 12/2013 | Choudrie | G06F 9/45558 726/1 |
| 2014/0208397 A1* | 7/2014 | Peterson | 726/4 |
| 2015/0106589 A1 | 4/2015 | Xaypanya et al. | |
| 2015/0106934 A1 | 4/2015 | Xaypanya et al. | |

OTHER PUBLICATIONS

U.S. Appl. No. 14/216,665, filed Mar. 17, 2014, Xaypanya et al.
U.S. Appl. No. 14/216,345, filed Mar. 17, 2014, Xaypanya et al.
U.S. Appl. No. 14/216,634, filed Mar. 17, 2014, Xaypanya et al.
U.S. Appl. No. 14/199,917, filed Mar. 6, 2014, Xaypanya et al.
International Search Report and Written Opinion for International (PCT) Patent Application No. PCT/US14/12841, mailed Jun. 16, 2014 8 pages.
International Search Report and Written Opinion for International (PCT) Patent Application No. PCT/US14/30362, mailed Aug. 22, 2014 8 pages.
International Search Report and Written Opinion for International (PCT) Patent Application No. PCT/US14/21098, mailed Aug. 5, 2014 7 pages.
International Preliminary Report on Patentability for International (PCT) Patent Application No. PCT/US2014/012841, mailed Aug. 6, 2015 7 pages.
International Preliminary Report on Patentability for International (PCT) Patent Application No. PCT/US2014/030362, mailed Sep. 24, 2015 7 pages.
International Preliminary Report on Patentability for International (PCT) Patent Application No. PCT/US2014/021098, mailed Sep. 24, 2015 6 pages.
Official Action for U.S. Appl. No. 14/216,345, mailed Nov. 6, 2015 12 pages.
U.S. Appl. No. 14/516,418, filed Oct. 16, 2014, Xaypanya et al.
U.S. Appl. No. 14/528,560, filed Oct. 30, 2014, Xaypanya et al.
International Search Report for International (PCT) Patent Application No. PCT/US2014/060926, mailed Jan. 29, 2015 11 pages.

* cited by examiner

SYSTEM, METHOD, AND APPARATUS FOR PROVIDING NETWORK SECURITY

CROSS-REFERENCE TO RELATED APPLICATIONS

The present application claims the benefit of U.S. Provisional Patent Application Nos. 61/756,573, 61/794,430, 61/794,472, 61/794,505, 61/794,547, 61/891,598, and 61/897,745, filed on Jan. 25, 2013, Mar. 15, 2013, Mar. 15, 2013, Mar. 15, 2013, Mar. 15, 2013, Oct. 16, 2013, and Oct. 30, 2013, respectively, each of which are hereby incorporated herein by reference in their entirety.

FIELD OF THE DISCLOSURE

The present disclosure is generally directed toward network security systems.

BACKGROUND

Enterprises and organizations cannot fight today's digital terrorists or cyber criminals with yesterday's defensively-focused security best practices. The primary problem with defensively-focused security solutions is that they do not provide a deterrent or countermeasure to stop repetitive or future attacks.

The truth is that nowadays security best practices and digital strategies have the shelf-life of a little over two weeks. Security professionals cannot detect or produce antidotes fast enough to keep up with the rate at which cyber criminals are evolving.

So the question remains, how do organizations and security professionals combat against an enemy that's continuously innovating their digital attacks? To proactively address this security challenge, organizations must adopt and practice an offensively-focused digital security policy.

SUMMARY

It is, therefore, one aspect of the present disclosure to provide a proactive security mechanism that can be employed to proactively protect a computing system or network. The disclosed proactive security mechanism and the hardware that implements it can actively identify new attacks and forms of malware in a matter of milliseconds and within seconds thereafter produce an effective countermeasure or antidote to combat and/or neutralize the malware.

To date, most digital attacks that occur have a lifespan or succession goal of exploitation under fifteen minutes. This means that most sophisticated cyber criminals will discontinue their hacking efforts after fifteen minutes. Employing embodiments of the present invention enables network security personnel to (a) become aware of and (b) identify a source of the attack possibly while the attack is still occurring. This means that even more effective countermeasures can be adopted whereas previously the cyber criminal was done interacting with an attacked system before the attack was ever detected.

In accordance with at least some embodiments of the present disclosure, an Analytical Neural Network Interface (ANNI) is disclosed that can detect/predict new forms of malware (e.g., untrusted or malicious code or code fragments)—continuously in real-time and proactively identify and defend against these new forms of malware before networks or computing devices connected thereto are compromised. A platform is also provided that identifies, de-engineers, and destroys malware in real-time across all network elements, including remote or mobile communication devices. Another aspect of the present disclosure is that ANNI proactively analyzes and re-combines the elements of malicious code and automatically and immediately generates countermeasures that defend against future malware of the same or similar type. Through the implementation of the proactive security system disclosure herein, malware is contained, decompiled, scrubbed, inoculated, and destroyed—all in sub-millisecond timeframes. It should be appreciated, however, that decompiling times may be dependent upon the nature of code detected.

In accordance with at least some embodiments of the present disclosure, a platform is disclosed which follows the core security principle of strike first. By following this principle, and with the use of ANNI, it is possible to actually identify malware in real-time (e.g., in microsecond response times). The proactive security mechanism described herein is capable of identifying, in most cases applying attribution and then aggressively attacking malware, thereby resulting in the prevention and elimination of both current and prospective security threats (e.g., known and unknown malware).

One aspect of the present disclosure is to provide a mechanism for protecting cloud-based networks. In some embodiments, any data transmitted over the cloud is encrypted and again scanned at its destination. ANNI probes every device logging onto the network for up-to-date patches and compliance (ANNI integrates within the compliance engines, firewalls, IPS, IDS et al).

In some embodiments, a method is provided for auto-scaling and installing the infrastructure capacity of an application using artificial intelligence as the main engine in response to client demands includes providing an application configured to run on an application infrastructure comprising a plurality of server nodes and to be accessed by clients via a first network. Next, providing traffic management means directing traffic from the clients to the server nodes of the application infrastructure automated by an advance neural cluster of artificial intelligence engines. Providing monitoring means gathering performance metrics of the application and metrics of the application infrastructure automatically by an advance neural cluster of artificial intelligence engines. Providing controlling means configured to change the application infrastructure pending the network infrastructure detected automatically by an advance neural cluster of artificial intelligence engines. Next, monitoring the performance metrics of the application and the metrics of the application infrastructure via the artificial intelligence automated monitoring means thereby obtaining metrics information semantically and then changing the application infrastructure based on the metrics information via the advance neural cluster of artificial intelligence engines means. Finally directing network traffic targeted to access the application to server nodes of the changed application infrastructure via the traffic-automated detection by an advance neural cluster of artificial intelligence engines means.

In accordance with at least some embodiments, ANNI's conceptual design is based on the methods and processes by which antibodies function in the human body. In general terms, antibodies isolate and destroy bacterial and viral threats to the body. The most successful biological drugs—particularly for cancer—use active antibodies. Currently, an improved form of antibody defense is being developed. Known as "armed antibodies," these antibodies (and recombinant fragments thereof) are linked to or fused with lethal molecules and deliver toxic payloads that are highly targeted to the tumor site, sparing normal cells from its devastating effect. In accordance with at least some embodiments, ANNI's code embodies the principles of armed antibodies. Specifically, ANNI's code may be configured to identify and capture malicious code attacks and incorporate (and recombine) that code to attack new instances of malicious code without disturbing any legitimate network process.

ANNI and the proactive security mechanism that implements ANNI represent a network technology that offers real-time threat identification, capture, signature creation and inoculation/destruction, as well as an artificial automated code building algorithm that keeps learning and developing new responses to unknown threats. In some embodiments, ANNI accomplishes this forward-looking response by real-time database construction whereby the topology of potential threats are identified from existing threats, those topologies are tested, and software is continuously and automatically re-engineered to protect against prospective threats.

Stated simply, ANNI and the proactive security mechanism disclosed herein enable an artificial intelligence-based, real-time, continuous monitoring security system, with both defensive and offensive capabilities within the domain. Among the benefits and features offered by ANNI and the proactive security mechanism implementing ANNI include, without limitation: (1) Protection against known and previously unknown malware or malicious code; (2) Specially designed and optimized hardware appliance engine enables microsecond response times; (3) Complement/integrate with existing network security point products; (4) Simplify and replace existing products as desired; (5) Provide real-time continuous monitoring and proactive response capability; (6) Network and host intrusion prevention and detection; (7) Real-time, automated, malicious code handling and decomposition; (8) Forensics; (9) Diagnostics; (10) Reporting; (11) Audit trail; and (12) Automated and manual response options; (13) Data Loss Protection.

In some embodiments, the ANNI platform gains inspiration from the human body reaction to attacks in preventing illness. When an unknown attacker enters a body (virus, cancer cell, etc.) the body's defenses immediately deploy a series of counter defenses to protect health. These natural countermeasures inspired the comprehensive security system disclosed herein.

In some embodiments, the proactive security mechanism and ANNI can run on most commercial off-the-shelf servers. ANNI's artificial intelligence capabilities permit it to self-discover enterprise, service provider, and government network elements and to self-deploy software elements to all devices on the network. ANNI, in some embodiments, is trained to be self-reliant with servers in the cloud to predict attacks, de-engineer malware, and provide constant malware signatures identification/creation. In some embodiments, ANNI is based on a fuzzy-logic, real time traffic profiling, behavioral analysis and neural network comprised of multiple development frameworks that work in-sync to accomplish real-time machine, social, and behavioral learning. The result is that ANNI can modify its own engine and its own learning behaviors in order to meet user needs.

In accordance with at least some embodiments, ANNI defends against advanced persistent threats/cyber-attacks and can respond offensively within the domain if necessary. Another aspect of the present disclosure is to provide a sentinel process which begins by detecting any code trying to replicate or open an outside port (e.g., a port to an untrusted network). In some embodiments, the proactive security mechanism treats the initial host network as an outside threat until the network is cleaned. These countermeasures are self-masking and can seek, analyze, follow, and eliminate outside botnets as they enter or attempt to traverse the network. The result of this network is the creation of a real-time machine, with social and behavioral learning.

At least some of the following modules/components can be integrated in a proactive security mechanism with the following capabilities:

Sentinel (capture, alert, interrogate, defend)
  (i) Identifies and captures malicious code and places it in a virtual container and conducts forensics on the same
  (ii) Identifies malware/contextual network behavior analysis
  (iii) Updates a blacklist to the network
  (iv) Informs other capabilities for potential action
  (v) Can integrate within IPS/IDS/Firewalls/Compliance engines Stealth (scouts out)
  (i) If attacked, the proactive security mechanism or its components can return to the malwares origination and start to gather data
  (ii) Creates recommendations on attack handling
  (iii) Traverses the open connection back to malware IP destination to gather information concerning network/hops/origination.
  (iv) Traces route to malware origination and captures IP and coordinates Roamer (assess the network)
  (i) Search for exact or similar digital signatures throughout the entire system
  (ii) When Roamers countermeasures discover active or dormant bots/malware it informs ANNI.

Predator (close with and destroy)
  (i) Implements countermeasure to destroy malware
  (ii) Cuts off all communications (such as occurs in denial of service attacks)

Intelligence (report results)
  (i) Combined measures to strengthen the network
  (ii) Understands how the malware was designed and adds it to security datastore Digital Signature Database
  (i) Stores hacking behavioral and system defense frameworks
  (ii) Storage intelligence is created by ANNI employing the cloud data mining server fees
  (iii) Using an ultra latency technology, which feeds data in real-time back to ANNI, ANNI then spreads it throughout the network system response layer Immune System—Real Time Defense Engine
  (i) Employs a real time scanning/pen-testing engine
  (ii) This engine provides counter attacks within the domain using signatures and behavioral frameworks created by the ANNI artificial intelligence code engine in real time Network Response System
  (i) ANNI employs a self-healing beta system, using data leak prevention methods and ANNI to sense and become alert to all network anomalies Virtual Machine (VM) Safe Boot (Hypervisor)
  (i) The disclosed VM system provides proactive security mechanism and/or ANNI the ability to safely boot up "in question" data packets or software within a virtual environment
  (ii) The virtual zone is where data or malware is decompiled for forensics
  (iii) Graphical User Replay—ANNI can rerun a malware attack visually to replay an attack to further learn/teach how the attack occurred.

(iv) ANNI creates an evidentiary audit trail in real time to assist in the identification of the malware as well as the prosecution of the hacker.
(v) ANNI self deploys on the network-identifying all assets (computers/servers/devices et al)

Cloud Behavioral Data Mining Servers
  (i) Data mining servers are anonymous servers designed to be self-generated by ANNI to mine for hacking trends and current behavioral data
  (ii) The behavioral data mining servers supply ANNI's artificial intelligence code engine with the necessary data feeds in real time in order to create defensive framework signatures to protect the network
  (iii) Ultra latency technology is employed in order to ensure that data is fed and gathered in real time Endpoint detection—Reverse NAC system
  (i) ANNI delivers a system that detects and manages network devices agent-less or, depending on the environment, ANNI will deploy countermeasure agents to control data access
  (ii) This detection and management process forces endpoints to comply and maintain security "best practices"
  (iii) Finally, ANNI has the ability to grant and in real time deny data/network access using ANNI Defense.

Automated forensics and the latest heuristics
  (i) Dramatically increase protection from variants and allows the system to grow stronger over time
  (ii) The result is that the system creates a wide range of opportunity for countermeasures Persistent, automatic updating
  (i) A critical weakness of current network security systems is that they tend to weaken over time, and so periodically need to be updated with signature files to sustain temporary relevance. Among its most valuable characteristics, multiple ANNI's throughout appropriate points in the network can act in near real-time, leaning from each other and updating blacklists automatically over the network enterprise
  (ii) Operating in a federated architecture, ANNI grows stronger and automatically updates itself, maintaining real-time permanent relevance A platform which may be configured to implement the proactive security mechanism and/or ANNI may include the following components: (1) Registry; (2) Memory; (3) Log files; and (4) One or more operating systems.

Still other aspects provided by the present disclosure include, without limitation:
  (i) Real-time understanding of what software has executed, how it arrived, and how it propagated
  (ii) Behavioral and hacking sensor
  (iii) Self-generates and updates "real-time" behavioral and hacking trends from globally deployed sensors and partner facilities
  (iv) Risk identification to enable proactive response
  (v) Event monitoring for microsecond reactive capability
  (vi) A complete audit trail of everything that has happened across the enterprise
  (vii) Methods for filtering noise (e.g., false positive filter(s))
  (viii) Instantaneous investigation and remediation of incidents
  (ix) Automated protection for all of the assets, across the entire enterprise
  (x) Counter-attacking features
  (xi) Equipped with defensive countermeasures
  (xii) Configure flexible, tiered enforcement policies to meet varied organizational needs
  (xiii) Blacklist, or actively ban, unauthorized software or known malware
  (xiv) Blacklist, or actively ban, potential and unknown malware
  (xv) Whitelist, or explicitly allow, trusted applications
  (xvi) Implement a default-deny posture
  (xvii) Providing network countermeasures
  (xviii) Invoke an enterprise lockdown
  (xix) Measurement
  (xx) View reports on the baseline drift of assets to see how far they have deviated from requirements
  (xxi) View reports on risk by user community, based on specific enforcement policies
  (xxii) Provide access to dashboards to review the overall health of enterprise security
  (xxiii) View reports showing audit trails and adherence to policies associated with compliance obligations
  (xxiv) Send unexpected events for helpdesk approval, and to syslog, SIEM, email, etc.
  (xxv) Provide detailed and comprehensive analytics about the origin of unauthorized software, its location, and when and how often it executed or attempted to execute
  (xxvi) Provide analytics about devices connected to systems In some embodiments, ANNI provides automated forensics and the latest heuristics. This automated forensics dramatically increase protection from variants and allows the system to grow stronger over time. The result is that the system creates a wide range of opportunity for countermeasures. Furthermore, ANNI's forensics can communicate using Text to Speech (TTS) and Automated Speech Recognition (ASR) services, (over 1000 TTS and compute in every language digitally available). ANNI is trained to be self-reliant with servers in the cloud to predict attacks, de-engineer malware and providing constant malware signatures.

Among its valuable characteristics, multiple ANNI's throughout appropriate points in the network can act in near real-time, leaning from each other and updating blacklists automatically over the network enterprise. Operating in a federated architecture, ANNI grows stronger and automatically updates itself, maintaining real-time permanent relevance.

In the initial installation on a network, ANNI can run in parallel for a time to definitively prove its value. Customers may initially place a packet capture device on the environment and watch the increased traffic in social media usage and online activity from the IT departments. IT can further develop the system, as ANNI can pick up any independent malware research and put it to use providing a collector is set up for that purpose. There is a manual input to the hypervisor (e.g., sandbox) environment which allows ANNI's network response and immune system to detect new malicious data. In some embodiments, direct changes to the digital signature engine are not allowed.

ANNI secures the data coming to/from the cloud entering the enterprise network. In some embodiments, any data transmitted over the cloud is encrypted and again scanned at its destination. ANNI probes every device logging onto the network for up to date patches, compliance, etc.

In some embodiments, ANNI can be configured to mitigate risk during installation and provide valuable metrics to let customers know that their defense parameters have improved. ANNI, in some embodiments, will discover all behavioral anomalies and can decompile and then de-engineer the malicious code in near real time. Furthermore, a report card can be provided in real time. As soon as ANNI is deployed, it may be configured to automatically begin trending data usage and user access to industry compliance related data access. At installation, ANNI detects network behavioral activity, ANNI then understands the overall network health and begins addressing security issues. Once ANNI deems the network at best practice it may be allowed to begin a vulnerability assessment—this process is constantly evolving to set up tactical parameters for the deployment of offensive countermeasures in vulnerable areas.

In some embodiments, ANNI's breakpoint is dependent upon the HPC configuration. A military grade DDOS attack requires the necessary hardware resources to deflect/absorb the attack and to be able to respond. Thus far, about 265,000 hits in 35 minutes did not stress ANNI running on a 8 CPU with 4 GPU blade server. ANNI can defend itself within microseconds. Human interaction is a breakpoint if system is set to react manually.

A brief summary of how ANNI can attack and destroy malware through its "Sentinel" system is provided below:
1. Malware is downloaded to a PC/Server/tablet/smartphone, etc;
2. Sentinel through process recognition or using ANNI DB/Hash identifies code as malware;
3. Sentinel informs a system stealth countermeasure (if enabled) to traverse the open connection back to malware IP destination to gather information concerning network/hops/origination;
4. The malware is automatically placed in a virtual container and all communications within the domain(s) or to other internal systems is cut off;
5. ANNI decompiles and then begins to de-engineer malicious code/identifies digital signature;
6. A new firewall rule is generated for the malware's IP address
   Single IP blocked
   IP range blocked
   octet blocking
7. Sentinel informs ANNI and begins forensics on the new malware code using the malware's digital signature;
8. All Sentinel countermeasures are informed of threat;
9. New malware address enters Blacklist-Blacklist is updated in real time to intelligent code throughout system;
10. Sentinel informs Roamer countermeasure to search for exact or similar digital signatures throughout the entire system;
11. Once a Roamer countermeasure discovers active or dormant bots/malware they inform ANNI;
12. ANNI sends attack sequence to Predator countermeasure to destroy malware;
13. Audit reports are generated automatically as process unfolds in real time;
14. ANNI designs an automated response and engineers an inoculation for malware and it is placed into the ProActive database.

All of the above-described processes can occur in a sub-millisecond timeframe.

In some embodiments, ANNI is configured and managed through a Comprehensive Console that manages the intelligences behind defending, reporting, and offensively attacking any digital threats. This console can be virtualized in a VMware environment, installed as a solo machine on the network, or managed by remote engineers from the cloud.

Other aspects of the present disclosure include the ability to utilize three-dimensional modeling. Embodiments of the present disclosure have an 3D modeling rendition integrated into the system. The 3D modeling rendition can be virtualized for disability assistance and to offer real life interaction for users.

Another aspect of the present disclosure is to utilize machine learning to continuously update the manner in which the system is protected. In some embodiments, machine learning libraries can be upgraded with GPU for continuous learning and improved product relevance.

Another aspect of the present disclosure is to enable motion-controlled command via gesture-recognition platforms. This integration can provide the ability to integrate ANNI into physical security systems which will enable camera and image behavioral analysis.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

Also, while the disclosure is described in terms of exemplary embodiments, it should be appreciated that individual aspects of the disclosure can be separately claimed. The present disclosure will be further understood from the drawings and the following detailed description. Although this description sets forth specific details, it is understood that certain embodiments of the disclosure may be practiced without these specific details. It is also understood that in some instances, well-known circuits, components and techniques have not been shown in detail in order to avoid obscuring the understanding of the invention The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
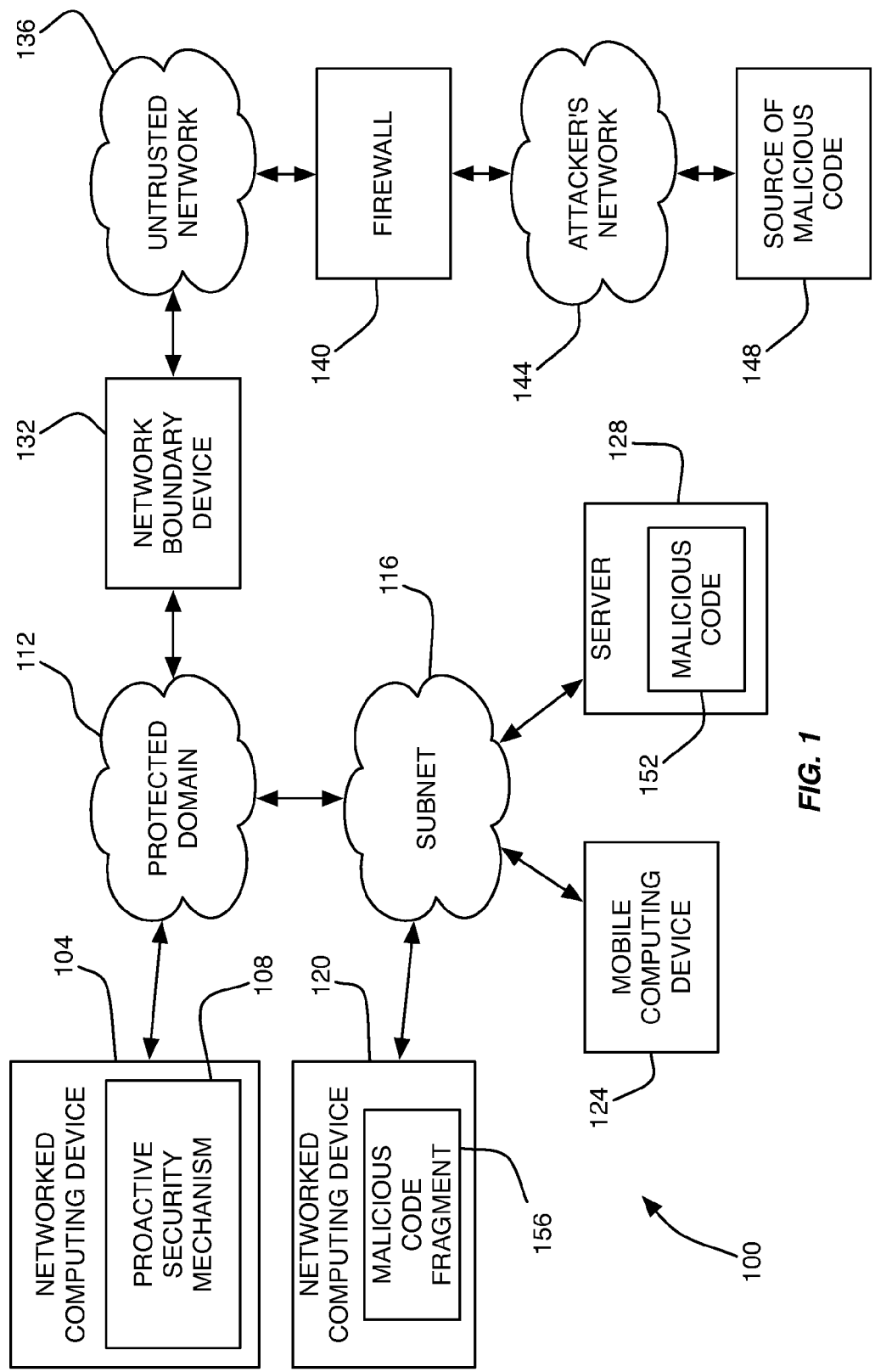
FIG. 1 is a block diagram depicting a computing system or network in accordance with embodiments of the present disclosure.

Referring initially to FIG. 1, a system 100 is depicted as including one or more networked computing devices 104, at least one of which is equipped with a proactive security mechanism 108 in accordance with embodiments of the present disclosure. As will be discussed in further detail herein, the proactive security mechanism 108, or components thereof, may be instantiated or executed by one or plural of the devices connected to a network. Although the proactive security mechanism 108 is depicted as being resident on the networked computing device 104, it should be appreciated that any device of system 100 may comprise some or all of the components of the proactive security mechanism.

Other components that may be included in the system 100 include, without limitation, a protected domain or network 112, a subnet 116, a networked computing device connected to the subnet 120, a mobile computing device 124, a server 128, and a network boundary device 132. The network boundary device 132 may correspond to a device or collection of devices that separate the protected domain 112 from an untrusted network 136 (e.g., the Internet). In some embodiments, the network boundary device 132 comprises one or more of a Session Border Controller (SBC), gateway, firewall, router, Network Address Translator (NAT), combinations thereof, or the like. The network boundary device 132, in some embodiments, corresponds to a collection of hardware and software components configured to separate and protect the protected domain 112 from the untrusted network 136 and devices connected thereto.

The protected domain 112 and/or subnet 116 may correspond to any network or collection of networks (e.g., computing networks, communication networks, etc.) configured to enable communications via packets (e.g., an Internet Protocol (IP) network). In some embodiments, the protected domain 112 and/or subnet 116 include one or more of a Local Area Network (LAN), a Personal Area Network (PAN), a Wide Area Network (WAN), Storage Area Network (SAN), backbone network, Enterprise Private Network, Virtual Network, Virtual Private Network (VPN), an overlay network, a Voice over IP (VoIP) network, combinations thereof, or the like. The subnet 116 may correspond to or comprise a logically visible subdivision of the domain's 112 IP network. One or more devices may reside between the subnet 116 and protected domain 112 although such devices are not depicted.

The networked computing devices 104, 120 may correspond to any type of computing device, communication device, or the like. Although the name suggests that the computing device is connected to a network, a networked computing device 104, 120 may simply be configured for connection to a network (e.g., via a Network Interface Card) even though the device may not actually be connected to a network. Suitable examples of networked computing devices 104, 120 include, without limitation, Personal Computers (PCs), laptops, tablets, smart phones, cellular phones, Personal Digital Assistants (PDAs), thin clients, super computers, servers, proxy servers, communication switches, Set Top Boxes (STBs), smart TVs, etc.

The server 120, in some embodiments, may correspond to any device or collection of devices configured to execute one or more routines. The server 120 may correspond to a physical computer (e.g., a computer hardware system) dedicated to run or execute one or more services as a host. In other words, the server 120 may serve the needs of users of other computers or computing devices connected to any of the networks depicted in FIG. 1. Depending on the computing service that it offers, the server 120 could be a database server, file server, mail server, print server, web server, gaming server, or some other kind of server.

In some embodiments, the mobile communication device 124 may be similar or identical to the networked computing device 104, 120. Suitable examples of a mobile communication device 124 include, without limitation, a smart phone, a tablet, a cellular phone, a hardphone, a softphone, a laptop, any 802.11x-enabled device (e.g., 802.11N, 802.11a, 802.11b, or any proposed or yet-to-be-developed version thereof), a satellite phone, or the like.

In some embodiments, the proactive security mechanism 108 may be configured to identify and protect the networks 112, 116 and the devices connected thereto from malware (e.g., malicious code 152 and/or malicious code fragments 156). As will be discussed in further detail with respect to FIGS. 2 and 3, the proactive security mechanism 108 may be equipped with one or more components that enable the real-time identification of malware resident on a networked device as well as the real-time creation of an inoculation/countermeasure for neutralizing and effectively stopping the malware or variants thereof from spreading through the networks 112, 116 or corrupting devices connected thereto.

Another capability of the proactive security mechanism 108 is to identify a source of malware 148, even if the source of malware 148 is connected to an attacker's network 144 that is located behind one or more firewalls 140. In particular, the proactive security mechanism 108 may deploy one or more components that are capable of tracing malware back to its source, thereby providing an opportunity to (1) further understand the nature of the malware and/or (2) create an appropriate countermeasure to proactively combat the source of the malware 148.

In some embodiments, the proactive security mechanism 108 may be configured to identify malicious code 152 by identifying malicious code fragments 156 on other computing devices. Stated another way, the proactive security mechanism 108 does not need to have the entire malicious code 152 to identify a signature of that code and search for similar code instances on a network. Rather, the proactive security mechanism 108 may analyze a malicious code fragment 156 and determine a signature for the malicious code fragment 156 as well as a signature for the malicious code 152, which may be the same or different signature as the signature of the malicious code fragment 156.

Figure 2:
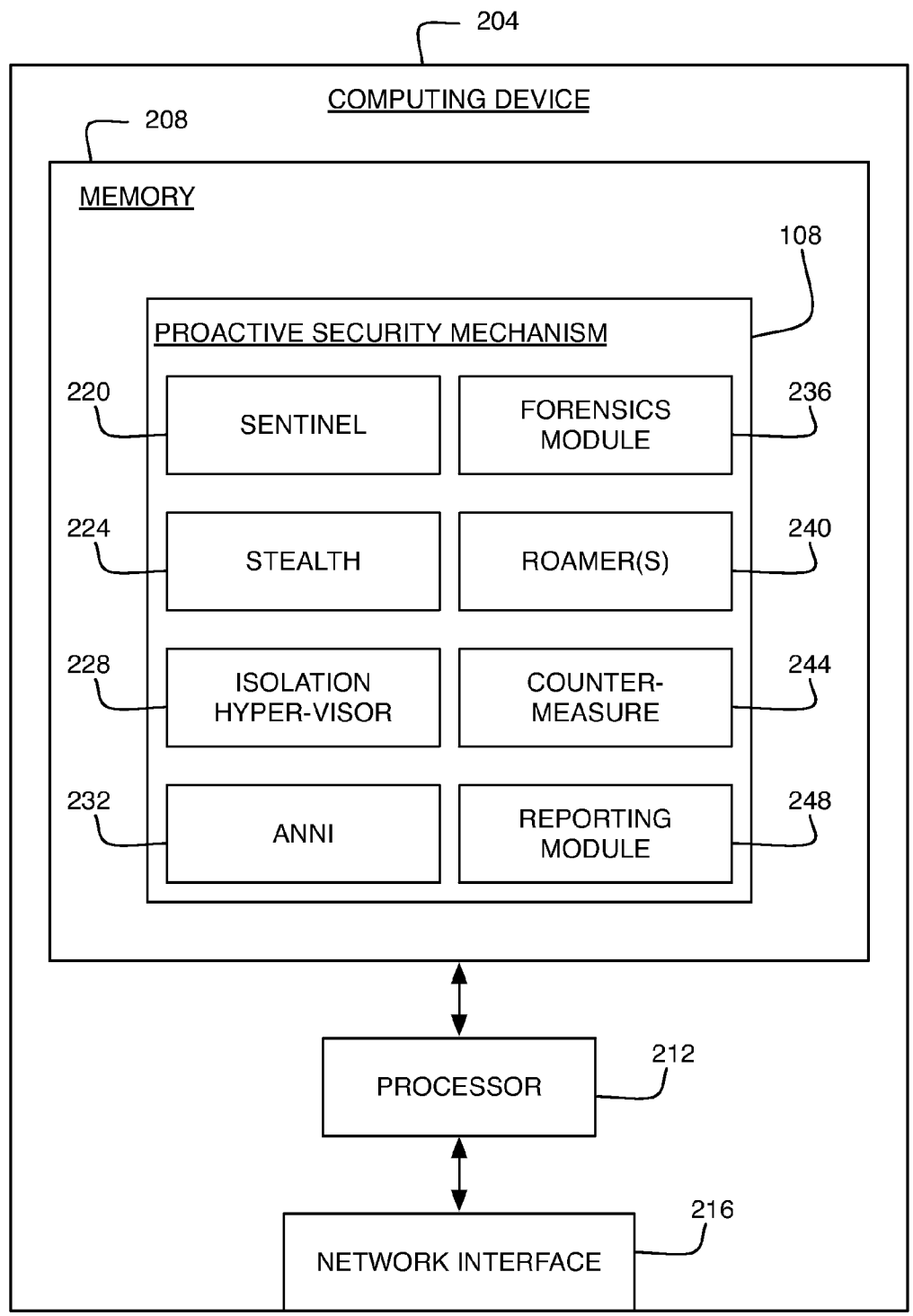
FIG. 2 is a diagram depicting components of a proactive security mechanism in accordance with embodiments of the present disclosure.
Figure 3:
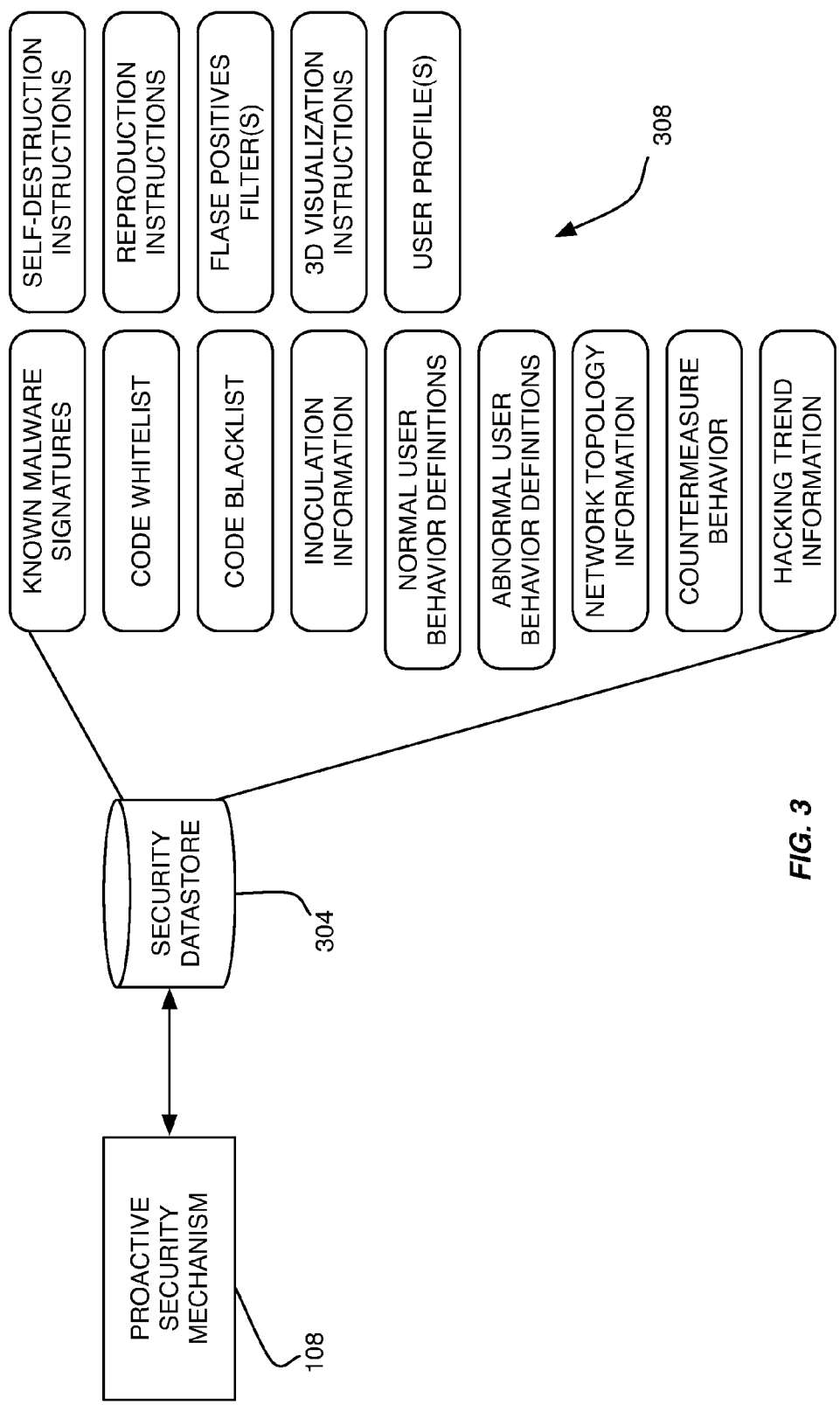
FIG. 3 is a diagram depicting logical components that can be stored in a security datastore in accordance with embodiments of the present disclosure.

With reference now to FIGS. 2 and 3, additional details of the proactive security mechanism 108, components and behaviors thereof will now be described in accordance with embodiments of the present disclosure. As noted above, the proactive security mechanism 108 may be implemented on one or more computing devices 204. As some examples, the proactive security mechanism 108 may be implemented on a server, Personal Computer, laptop, smart phone, or combinations thereof. The computing device 204 comprising the proactive security mechanism 108 may further include memory 208, a processor 212, and a network interface 216.

The proactive security mechanism 108 may be deployed on one or more local enterprise servers, via a web-based architecture (e.g., as Software as a Service (SaaS), as a cloud-based service, etc.), via cluster computing, or via any other known architecture. In other words, the computing device(s) 204 may correspond to systems comprising one or more servers, computers with processors and memory, virtual machines, FPGAs, ASICs, or combinations thereof.

The memory 208 may correspond to any type of non-transitory computer-readable medium. Suitable examples of memory 208 include both volatile and non-volatile storage media. Even more specific examples of memory 208 include, without limitation, Random Access Memory (RAM), Dynamic RAM (DRAM), Static RAM (SRAM), Flash memory, Read-Only Memory (ROM), Programmable ROM (PROM), Erasable PROM (EPROM), Electronically Erasable PROM (EEPROM), virtual memory, variants thereof, extensions thereto, combinations thereof, and the like. In other words, any type of electronic data storage medium or combination of storage media may be used without departing from the scope of the present disclosure.

The processor 212 may correspond to a general purpose programmable processor or controller for executing programming or instructions stored in memory 208. In some embodiments, the processor 212 may include one or multiple processor cores and/or virtual processors. In other embodiments, the processor may comprise a plurality of separate physical processors configured for parallel or serial processing. In still other embodiments, the processor 212 may comprise a specially configured Application Specific Integrated Circuit (ASIC) or other integrated circuit, a digital signal processor, a controller, a hardwired electronic or logic circuit, a programmable logic device or gate array, a special purpose computer, or the like. While the processor 212 may be configured to run programming code contained within memory 208, such as the proactive security mechanism 108, the processor 212 may also be configured to execute other functions of the computing device 204 such as an operating system, one or more applications, communication functions, and the like.

The network interface 216 may comprise any hardware device or combination of hardware devices that enable the computing device 204 to communicate with other devices via a communication network. In some embodiments, the network interface 216 may comprise a network interface card, a communication port (e.g., an Ethernet port, RS232 port, etc.), one or more antennas for enabling wireless communications, one or more drivers for the components of the interface, and the like. The network interface 216 may also comprise the ability to modulate/demodulate, encrypt/unencrypt, etc. communication packets received at the computing device 204 from a communication network and/or being transmitted by the computing device 204 over the communication network. The network interface 216 may enable communications via any number of known or yet to be developed communication protocols. Examples of such protocols that may be supported by the network interface 216 include, without limitation, GSM, CDMA, FDMA, and/or analog cellular telephony transceiver capable of supporting voice, multimedia and/or data transfers over a cellular network. Alternatively or in addition, the network interface 216 may support IP-based communications over a packet-based network, Wi-Fi, BLUETOOTH™, WiMax, infrared, or other wireless communications links.

As noted above, the proactive security mechanism 108 may comprise a number of components or modules configured to enable the proactive security mechanism 108 to proactively identify malware (e.g., malicious code 152 and/or malicious code fragments 156) within a protected domain 112 or a subnet 116 thereof. The proactive security mechanism 108 may also comprise the ability to successfully treat or combat the identified malware without affecting networking operations.

Non-limiting examples of the components that may be included in the proactive security mechanism 108 include a sentinel module 220, a stealth module 224, an isolation hypervisor 228, ANNI 232, a forensics module 236, one or more roamers 240, a countermeasure module 244, and a reporting module 248. In operation, the sentinel module 220 may be configured to refer to a security datastore 304 and the information 308 contained therein to identify the existence of malware in a network. In some embodiments, the sentinel module 220 may refer to one or more known malware signatures to determine if a packet or combination of packets that have entered the network correspond, potentially or in fact, to malware. Alternatively or additionally, the sentinel module 220 may refer to user behavior definitions (normal, abnormal, user profiles, etc.) to determine if activity at a computing device 204 corresponds to known or expected behavior. For instance, a user may have a user profile that indicates a general user pattern (e.g., web surfing patterns, workflow patterns, usual applications opened, order of applications being opened, types of executables run, time of usual work, etc.). Any deviation from normal user behavior definitions may be considered suspect and any packet of information or code, whether encrypted or unencrypted, that attempts execution during such a deviation may be considered actual or potential malware.

If the sentinel module 220 determines that activity at the computing device 204 does not correspond to known, normal, or expected behavior or if the sentinel module 220 detects one or more packets of information received at a network interface 216 that are unknown, untrusted, or exhibit properties similar to known malware, then the sentinel module 220 may invoke other components of the proactive security mechanism 108 to isolate, analyze, and further process the packets.

It is one aspect of the present disclosure to provide the proactive security mechanism 108 with the nature of mistrust. Specifically, the sentinel module 220 is configured not to trust packets of information or unknown user behaviors and will therefore treat any packet or packet fragment as malware unless and until that packet or packet fragment is validated as not being malware. This validation may occur automatically or with the assistance of user input at the computing device 204, for example. The sentinel module 220 may be configured to use a rules engine that analyzes user behaviors at the computing device 204, contents of packets received at the network interface 216, contents of packet headers received at the network interface 216, etc. By analyzing all data packets received at a network interface 216, the sentinel module 220 is capable of quickly identifying any malware as soon as it enters the protected domain 112, even if the malware is entering in fragments.

When the sentinel module 220 detects a packet or combination of packets (e.g., software, instructions, data, etc.) that are untrusted, even if they do not yet correspond to malware having a known signature, the sentinel module 220 simultaneously invokes one more modules within the proactive security mechanism 108 (e.g., the stealth module 224, ANNI 232, and/or roamer(s) 240). The steal module(s) 224 are configured to proactively seek out a source of potential or positively identified malware 148 whereas ANNI 232 is configured to isolate the potential malware, de-engineer the potential malware, and run additional diagnostics on the code or code fragment. The roamer(s) 240 are configured to search the protected domain 112 and any subnets 116 for pieces of code that partially or completely resemble the potential malware identified by the sentinel module 220.

More specifically, the stealth module 224 may correspond to one or more pieces of code that are configured to analyze the information of one or more packets (e.g., header information, payload information, routing information, addressing information, etc.) identified by the sentinel module 220 as being potential or actual malware and, based on the analysis of the packet information, search out the source of malicious code 148. In some embodiments, the stealth module 224 may be configured to identify the source of malicious code 148 even though the source of malicious code 148 is separated from the protected domain 112 by one or more firewalls 140. Additionally, the stealth module 224, among other components of the proactive security mechanism, may comprise a self-masking capability that essentially enables the stealth module 224 to reach the attacker's network 144 without detection. Further still, the stealth module 224 may comprise a self-destruction component that causes the stealth module 224 to self-destruct if it believes it has been identified or discovered, thereby preventing detection of the origination of the stealth module 224.

ANNI 232 may comprise the ability to gather the packet(s) or code fragments identified by the sentinel module 220 and place the potential malware into the isolation hypervisor 228. In some embodiments, the isolation hypervisor 228 corresponds to a secure sandbox (e.g., virtual machine, virtual container, or virtual computing platform) where actual and potential malware can be placed for analysis by ANNI 232. The actual and potential malware can be placed into the isolation hypervisor 228 by the sentinel module 220 and/or ANNI 232 and then ANNI 232 can allow the actual or potential malware to run, execute, or the like within a safe and contained system. By placing the malware into the isolation hypervisor 228, ANNI 232 is allowed to safely de-engineer the malware, determine one or more signatures that define or describe the malware, and/or prepare one or more countermeasures 244 for the malware. All of this de-engineering and analysis can be performed in a matter of milliseconds, which means that actual and potential malware can be identified on a real-time basis, all without disrupting networking activities.

In some embodiments, ANNI 232 becomes a real-time forensics tool that can quickly identify malware, generate database signatures for the malware, cause the malware signatures to be written into the security datastore 304 so that they can be referenced by other components of the proactive security mechanism 108 (e.g., sentinel 220, roamer(s) 240, etc.), generate inoculation information or instructions for the malware, update a code whitelist and/or blacklist, update countermeasure behavior(s), and so on. ANNI 232, based on its de-engineering of the malware, is also configured to place inoculation instructions for malware back into the security datastore 304 in real-time.

One of the reasons that ANNI 232 is configured to execute these functions so quickly is because ANNI 232 is configured to be executed on a High-Performance Computing (HPC) platform that is based on CPU, GPU, and/or APU. In some embodiments, ANNI lives in RAM and can be executed on one or more server blades that communicate with one another at 40-50 Gbytes/sec. Furthermore, the efficiency of ANNI 232 can be increased because ANNI 232 is configured to work or operate during system interrupts. This means that additional computations can be made by ANNI 232 even though other components of the protected domain 112 are not executing any code. ANNI 232 may also be configured to optimize countermeasures 244 that are hardware specific. For example, ANNI 232 may develop a first type of countermeasure 244 if malware is detected at a first type of hardware (e.g., router, firewall, etc.) whereas ANNI 232 may develop a second type of countermeasure 244 if the same malware is detected at a second type of hardware (e.g., computing device, hub, switch, etc.). The countermeasures 244 developed by ANNI 232 during its de-engineering of the malware may help protect the hardware from further attack (e.g., isolate or contain the malware) or to help protect other hardware components from the spread of attack (e.g., purposefully destroy or deactivate the hardware or its components).

The forensics module 236 may be configured to disseminate the countermeasures and other information generated by ANNI 232. In some embodiments, the forensics module 236 is configured to execute a routine that informs all sentinels 220 in the system 100 of the updates to the security datastore 304. Specifically, the forensics module 236 may be configured to inform all sentinels 220 that one or more entries in the data 308 have been updated. For instance, the forensics module 236 may inform the sentinels 220 that updates have occurred for one or more of known malware signatures, code whitelist, code blacklist, normal user behaviors, abnormal user behaviors, countermeasure behavior, hacking trend information (e.g., as obtained from passive analysis of cloud resources), user filters, etc. The forensics module 236 may also inform the roamers 240 of such updates, thereby enabling the roamers 240 that are proactively searching existing code in the protected domain 112 to search for the newly-discovered malware. This updated information effectively protects the domain 112 from attacks where the malware enters a network and remains dormant for a period of time before activating (e.g., Trojan Horse Attacks).

The roamer(s) 240 may be configured to refer to information in the security datastore 304 to proactively search the domain 112 and devices connected thereto for bits and pieces of a bot or malware. In some embodiments, the roamer(s) 240 are configured to search computing devices that do not have the sentinel 220 provided thereon. If a roamer 240 detects a piece of code that at least some features matching features of known malware, then the roamer 240 causes the code to be placed into the isolation hypervisor 228 for analysis by ANNI 232.

The countermeasure module 244 may be configured to implement one or more countermeasures that have been developed by ANNI 232 during its analysis and de-engineering of malware. In some embodiments, the countermeasure module 244 is configured to be invoked by a roamer 240 and/or sentinel 220 and, upon being invoked, go attack a source of malicious code 148. By attacking the malware at its source, the countermeasure module 244 is able to prevent the further dissemination of malware to other networks, including the protected domain 112 as well as other domains. The types of countermeasures that may be invoked by the countermeasure module 244 include, without limitation, destruction of the code, disruption of service for hardware components having the code, etc.

ANNI 232 may also comprise the ability to identify a network topology (e.g., a topology of the protected domain 112) or a topology of other networks beyond the network boundary device 132. In some embodiments, ANNI 232 is configured to identify every asset (e.g., computing device) connected to a protected domain 112 and any subnet 116 thereof. Once ANNI 232 determines that such devices are trusted and do not contain any malware, ANNI 232 may add the assets to an asset whitelist, which may stored in the security datastore 304. ANNI 232 may also determine the network topology for other devices residing behind a firewall 140 (thus incorporating the source of malicious code 148 into the network topology view). This feature enables ANNI 232 to build a three-dimensional map or visualization of the source of malicious code 148 and where it resides relative to the protected domain 112. In some embodiments, this feature acts as a deterrent to cyber criminals, especially if they know that their whereabouts have been determined. The map or visualization of the network topology may be provided to a security administrator of the protected domain 112 and/or back to the source of malicious code 148, informing them that their location has been determined.

In some embodiments, some or all actions of the components in the proactive security mechanism 108 may be tracked, audited, and reported by the reporting module 248. Specifically, the reporting module 248 may be configured to determine when any of the components of the proactive security mechanism 108 have been invoked and as well as the results of their execution. The reporting module 248 can report activity of the proactive security module 108 in real-time (e.g., any time the sentinel 220 detects malware, the reporting module 248 may report such an activity). In some embodiments, the reporting module 248 generates and sends an electronic message (e.g., email, SMS message, etc.) to pre-defined security personnel. Additionally or alternatively, the reporting module 248 may generate daily or periodic reports of the activity of the proactive security mechanism that can be distributed as desired In some embodiments, ANNI 232 and other components of the proactive security mechanism 108 may comprise the ability to protect themselves from attack. As an example, if a brute force attack is detected (e.g., with a plurality of attacking malware components), then the proactive security module 108 or ANNI 232 may disable some or all of itself as well as a network interface 216 that connects the computing device 204 to the communication network. Another possible response that can be implemented by the proactive security module 108 or ANNI 232 is the ability to disable or destroy itself at one location and reproduce itself at another computing device 204 connected to the network.

It should be appreciated that the data 308 stored in the security datastore 304 may be organized in any known fashion. As an example, the data may be stored in a relational or hierarchical database (e.g., a SQL database). As another example, the data 308 may be stored in a tabular or columnar format and it may be compressed or uncompressed. In other words, the organization of the data 308 should not be construed as being limited to a particular format or structure.

Figure 4:
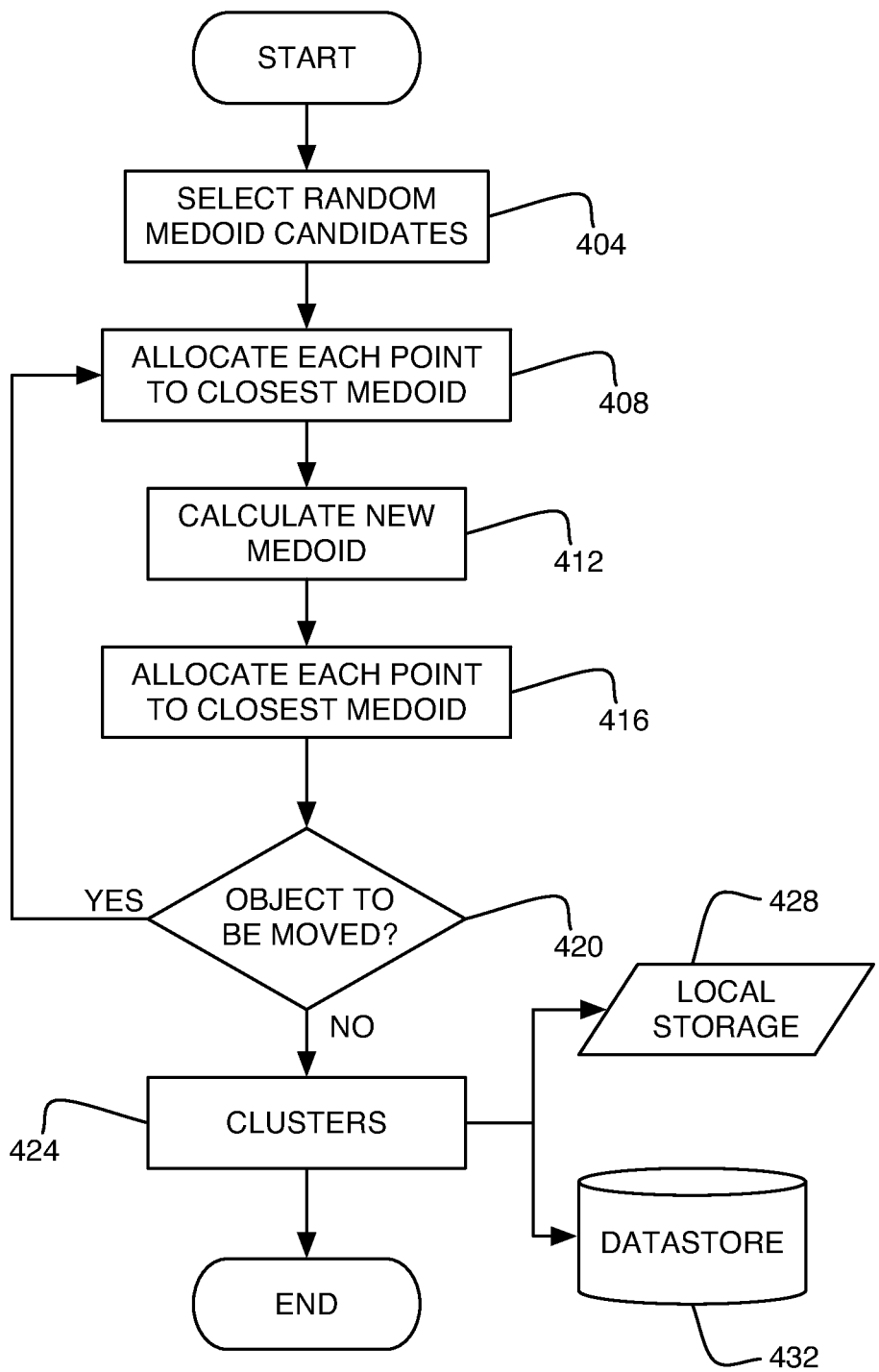
FIG. 4 is a flow chart depicting a method of administering network security in accordance with embodiments of the present disclosure.
Figure 5:
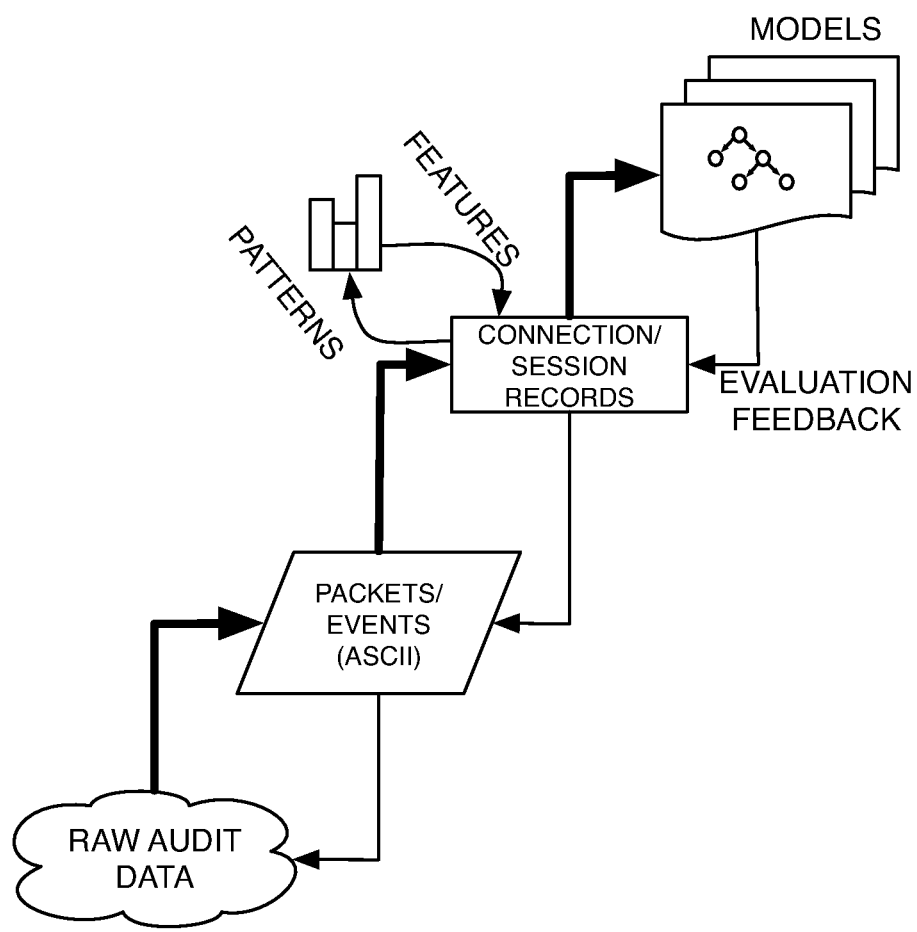
FIG. 5 is a block diagram depicting a process for building models used by the proactive security mechanism in accordance with embodiments of the present disclosure.

FIGS. 4 and 5 depict further details of the AI framework that may be implemented by ANNI 232 or any other component of the proactive security mechanism 108. Specifically, ANNI 232 may implement a three-anomaly detection technique. The first anomaly may correspond to a Fuzzy Clustering Algorithm (fuzzy logic)+data mining which is used to determine automated intrusion detection. The second anomaly may utilize Feature Set Reduction with a J48 decision tree machine learning or neural networks. The third anomaly may utilize decision tree machine learning and Support Vector Machine.

As shown in FIG. 4, genetic algorithms could be used to tune the fuzzy membership function parameters. A fuzzy c-medoids algorithm may be used to select random medoid candidates (step 404), allocate each point to the closest medoid (step 408), calculate new medoids (step 412), allocate each point to closest medoid (step 416), determine whether an object is to be moved (step 420) and, if not generate cluster data (step 424). The cluster data can then be stored in local storage (step 428) and/or a datastore (step 432).

Data mining techniques may be used. Data mining techniques basically correspond to pattern discovery algorithms, but most of them are drawn from related fields like machine learning or pattern recognition. In context to intrusion detection following data mining techniques, one or more of the following techniques may be utilized in accordance with embodiments of the present disclosure: (1) Association rules—defines the normal activity by determining attribute correlation or relationships among items in dataset which makes discovery of anomalies becomes easy; (2) Frequent Episode rules—describes the audit data relationship using the occurrence of the data; (3) Classification—classifies the data into one of the available categories of data as either normal data or one of the types of attacks; (4) Clustering—clusters the data into groups with the property of inter-group similarity and intra-group dissimilarity; and (5) Characterization—differentiates the data, further used for deviation analysis.

FIG. 5 shows the data mining process of building intrusion detection models, some of which may be stored in the security datastore 304 for use by the proactive security mechanism 108.

Still other embodiments of the present disclosure can cluster multiple malware detection and prediction techniques such as using abnormal Time-to-Live (TTL) values to identify malicious packets, using AI behavioral detection, and using a virtual machine safe/sandbox.

With respect to the AI behavioral detection, frameworks of malicious signatures, can be clustered from industry and real time creation internally. These clustered signatures can be passed through a decision tree and clustered of fuzzy net algorithms then position towards the correct countermeasures.

As discussed above, one unique aspect is the ability to utilize a hypervisor as a safe environment for decompiling and de-engineering potential malware. Unknown or uncertain packets can be sent to a machine learning HPC blade on which ANNI runs the malware using opensource stacked, cross-platform technologies coupled with additional code. Similar to WINE, in a safe virtual sandbox (e.g., in an isolated environment), information about the APIs called by the potential malware can be collected. Then hash dumps, along with signatures are sent back to ANNI to proceed with countermeasures decisions.

Figure 6:
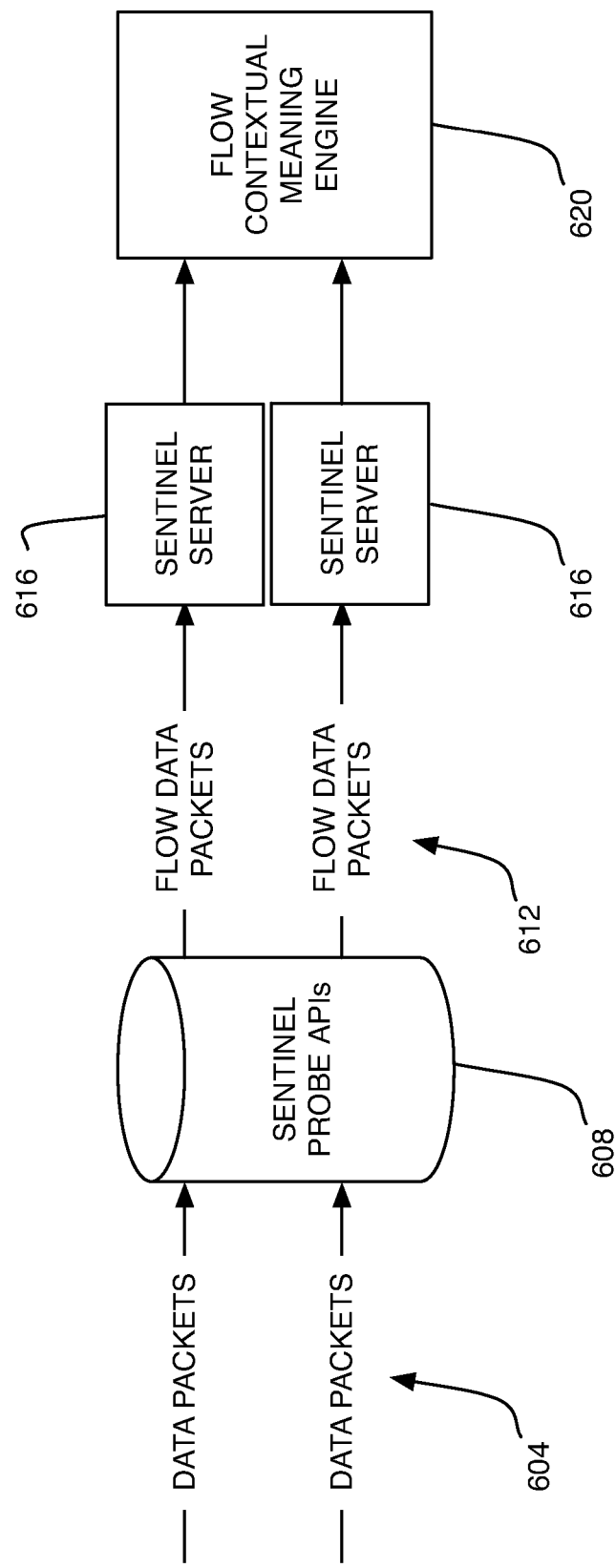
FIG. 6 is a diagram depicting data packet flows during processing by the proactive security mechanism in accordance with embodiments of the present disclosure.
Figure 7:
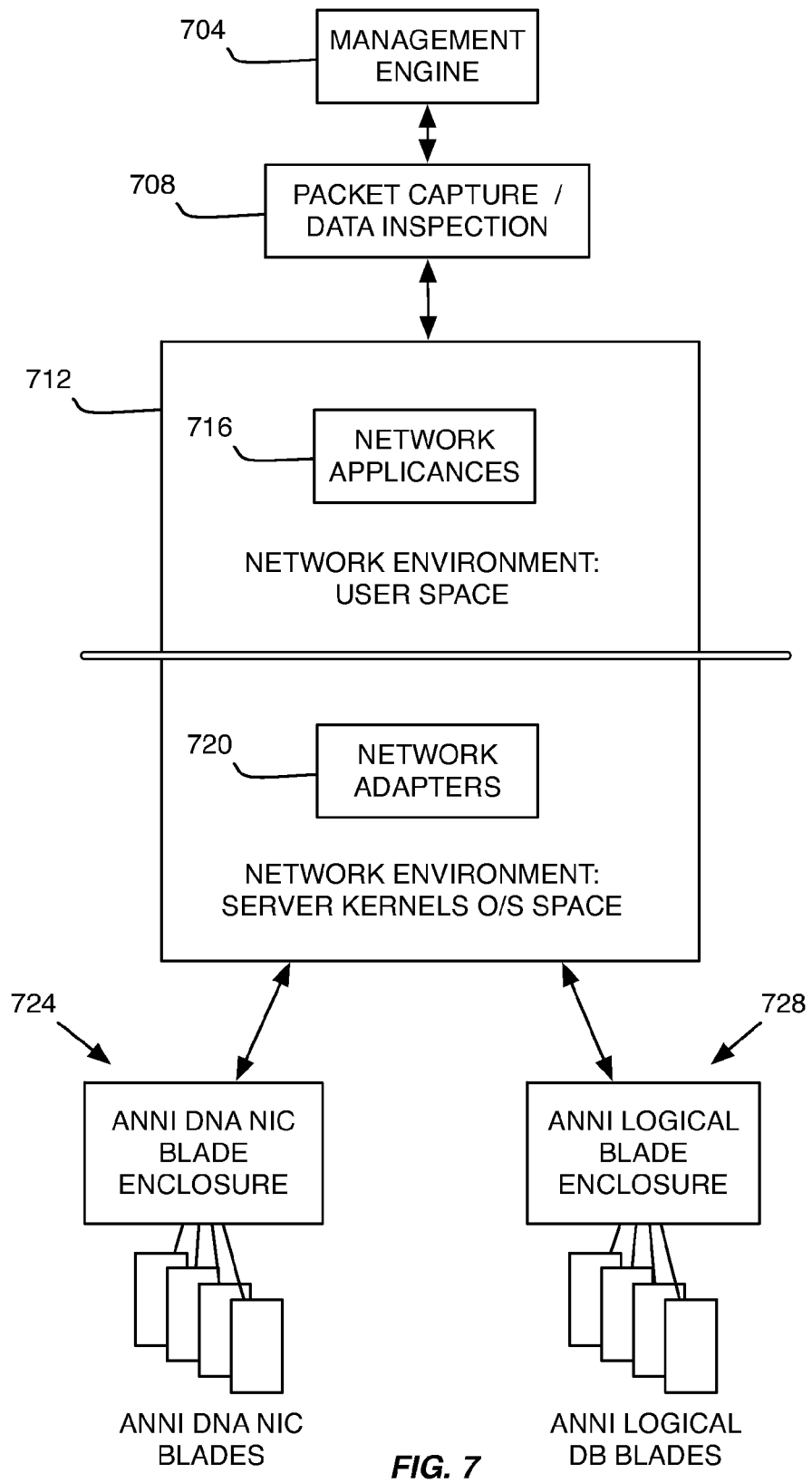
FIG. 7 is a block diagram depicting details of an application flow within an installed environment in accordance with embodiments of the present disclosure.

FIGS. 6 and 7 depict additional details of the hardware used to execute ANNI 232 and other aspects of the proactive security mechanism 108. More specifically, FIG. 6 depicts aspects of an HPC system used to analyze data packets 604 received in a computing network at extremely high speeds. It should be appreciated that some or all of the components depicted in FIG. 6 may be executed within the proactive security mechanism 108 or any other security device described herein.

Data packets 604 may be received in an encrypted or unencrypted format. Once received and prior to being passed to their destination (e.g., as defined within a destination address of the data packet 604), the data packets 604 are processed by a sentinel probe API 608, which creates a data packet flow 612. In some embodiments, the sentinel probe APIs 608 include sensors in the form of an infiniband and FDR probing Network Interface Card.

In some embodiments, malicious traffic is detected using event language (e.g., Eventron Programming Language as a non-limiting example) based on first order logic. As an example, neural networks are only created when detection of new data or packets occurred at the gateway or data flow sensors. ANNI's neural networks can be established and used to find association within the new datasets then regress the context of "why, how, and what" the data is incoming or created within the network. Once ANNI 232 understands the associations and context of the newly created data or incoming packet, the neural networks are destroyed. Context or understanding of the data is stored as a DNA algorithm subset that the Artificial Intelligence only understands. As a simple example, ANNI 232 may learn meaning by detecting patterns and associations.

When new data is intercepted or networking packets differentiates from ANNI's DNA stored-data-context/meaning-database, ANNI's 232 brain at default was designed to mimic the neurophysiology of a 2-year-old child at the main collection point of data (e.g., at the sensor or gateway level).

When new datasets are introduced within a protected network, ANNI 232 creates an infinite umber of neural networks (e.g., the variations of neural sets depend on the size and weight of the data in question) with large connections, asymmetrical graphs to find association then context meaning of the data. ANNI 232 starts the initial process by first collecting any and all binary spikes caused by the newly introduced data/packet from various networking and system sensors. Once ANNI 232 has a real time 'snap shot' of the environment's digital profile (e.g., at the moment when the data set in question was introduced) and security health of the protected environment, ANNI 232 compresses this knowledge into a neural model then performs regression on the dataset by using a cluster of semantic querying and correlation engines to sort for association and historical behavior patterns (whitelist and known malicious) between the variation binary spikes, historical profiles (whitelist and known malicious), current digital health of the environment, along with other behavioral techniques. This computing process is achieved by utilizing ANNI's 232 customized 40 GigE packet capturing NIC cards to pull new data or unknown datasets in real-time from incoming or directly from the internal data flow using direct data tapping to collect for association and meaning, once completed the same NIC stack data bursts the dataset or packet back into network route to the destination without networking delay.

NIC cards have 64 core independent FPGA or ASICS chipsets and come with a min 256 gig or 512 gig of memory per NIC, each NIC card provides line-rate throughput with 100% lossless packet capture and injection for all Ethernet packet sizes. Each card was developed to reduce latency by using a packet capture mechanism that adapts to various incoming packet rates such that packets can be received within a couple of microseconds. Because the cards are designed to use partitioning, duplication, and process sharing for enhanced multi-core awareness (done by partitioning incoming flows across integrated the 64 core FPGA or ASICS CPU chipsets), this design creates simplicity and frees the processing time constraints under high packet loads for applications performing deep packet inspection (DPI). The NICs can duplicate incoming packets into multiple receive rings so that multiple the FPGA CPU 64 cores can concurrently apply different semantic query on the same dataset or packet collection. The NIC cards are programmed to auto-timestamps all incoming packets as well all newly detected datasets to reflect actual packet/data arrival or collection time.

NIC cards can be customized to integrate directly and share logic with the HPC's blade 4 independent GPU processors that allocate and compress incoming packets and decompile data patterns into byte size DNA contextual language which the main Artificial Intelligence interpreter engine uses to determine meaning then stores for future logic regression. In some embodiments, the main Artificial Intelligence interpreter is a cluster of 6 customized ASICS 64 chipsets or 6 standalone GPU processors that decompress and resolve for context.

The flow data packets 612 are then provided to one or more sentinel servers 616 (which may execute similar functionality to the sentinel 220 described above). The sentinel server(s) 616 collect the flow data packets 612 and organize them such that they can be passed to a flow contextual meaning engine 620. In some embodiments, the flow contextual meaning engine 620 executes the additional aspects of the proactive security mechanism 108. In particular, the flow contextual meaning engine 620 may implement ANNI 232 to analyze the inputs received from the sentinel server(s) 616 and determine whether the flow data packets 612 comprise a recognized or unrecognized (e.g., anomalous) pattern, characteristic, and/or signature. Furthermore, the flow contextual meaning engine 620 may provide a data visualizer with pattern correlation functions that enables the HPC to identify anomalous behavior in real-time and further generate countermeasures to any malware identified during the analysis.

In some embodiments, ANNI 232 is radically different from any other forms of neural networks or artificial intelligences. In particular, ANNI 232 does not have any neural structures pre-defined by the user. ANNI's 232 neural network(s) resembles neurological structures where connections between the nodes are autonomic-forming without conscious control.

Connections from an n-dimensional graph that describes all relationships between every byte that has been fed into the system. This enables ANNI 232 to learn at the find of data ingestion—automatically adjusting relationships to account for new data.

As it learns, ANNI 232 creates a minimal ontology that automatically classifies each byte into a hierarchy by topic— staring with the most general then progressively moving to most specific. An unlimited number of hierarchies can form in any direction—forming a heterarchy. (Hierarchical classifications are arranged by hyponymy.) ANNI 232 may detects inherent semantic meaning of each byte as it relates to another—there is no human bias or over-learning. This minimal ontology approach enables the machine to learn high-order relationships between any data elements. Said another way, ANNI 232 can detect the conceptual meaning of words and isolate when a word is used in an unexpected or unique way.

ANNI 232 also offers users the option to teach the system, giving the machine an intentional point of view. Searches can be input to the minimal ontology that dynamically adjust the topography of the data to influence the importance of data elements to specific relationships. Enabling the system to learn the best path to answer a problem. If the problem is repeated, ANNI 232 may tighten the association among the relevant data elements that form the answer. Like muscle memory in humans.

Different from neutral nets, ANNI 232 reveals all relationships that comprise the answer to a problem. Semi-transparency. Teachable—commands within SDK allows users to instruct ANNI 232 to make specific association and ignore others. Directing ANNI 232 to external resources or global servers to learn patterns is recommended and potentially faster. In particular, ANNI 232 is both language and data agnostic and is configured to learn at the byte level. Context or ANNI's learn database datasets require that substantial tinkering occur by activating or deactivating parts of ANNI's neural model, without altering the actual code. For example within the 64 bit Linux micro-kernel, which at boot time discovers what CPU it is running on, and actually disables parts of its binary code in case (for example) it is running on a single CPU system. This goes beyond something like if (numcpus>1), it is the actual nopping out of locking Crucially, this nopping occurs in memory and not on the disk based image. ANNI's context database is stored like RLL or MFM coding. On a hard disk, a bit is encoded by a polarity transition or the lack thereof. A naive encoding would encode a 0 as 'no transition' and 1 as 'a transition'. Encoding 000000—keeps the magnetic phase unchanged for a few micrometers. During decoding, to understand exact micrometers, data is treated that long stretches of no transitions do not occur. If ANNI observes 'no transition, no transition, transition, transition' on disk, ANNI can determine that the context DNA byte corresponds to '0011'—it is exceedingly unlikely that ANNI's reading process is so imprecise that this might correspond to '00011' or '00111'. So the system is developed to insert spacers so to prevent too little transitions. This is called 'Run Length Limiting' on magnetic media. Transitions need to be inserted to make sure that the data can be stored reliably. ANNI's learning context cell or datasets cannot clone unless very stringent conditions are met—a 'secure by default' configuration.

FIG. 7 depicts additional details of the HPC environment in an installed system. The management engine 704 may comprise the main logical AI engine that executes the main application of the proactive security mechanism 108. In some embodiments, the management engine 704 comprises an 8-blade cluster HPC. The management engine 704, which houses the main artificial intelligence engine, may comprise the natural language and digital byte reasoning learning tree framework that visualizes new flow data into meaning categories for the AI engine to decipher for malware or reasoning.

The management engine 704 may be in communication with a packet capture/data inspection module 708. The packet capture/data inspection module 708 may provide the sentinel 220 capabilities used for gathering data packets 604 within the computing network. The packet capture/data inspection module 708 may provide an interface between the management engine 704 and server cluster 712 that is used to process/analyze data packets. Thus, the main engine 704 may control operations of the servers 712 via the packet capture/data inspection module 708.

The server cluster 712 may include two different network environments: (1) a user space and (2) a server kernel and Operating System (O/S) space. The user space may include network appliances 716 that simulate a user's interaction with packets collected by the packet capture/data inspection module 708. In particular, the network appliances 716 may include digital profiles of users within a computing network to help determine/define normal and/or trusted user behavior within the computing network. Data packets received at the network appliances 716 may be executed to see which APIs are called by the data packets and further see if such calls are within a normal or expected behavior.

The server kernels O/S space may include network adapters 720 that operate a suite of applications, thereby enabling ANNI 232 to determine if operation of the application in response to execution of the received packets poses a threat to the computing network. The applications within the server kernels O/S space may actually be executed by one or many NIC blades that belong to either a DNA NIC blade enclosure 724 or a logical blade enclosure 728 that are executing ANNI 232 at an extremely high speed, thereby enabling malware and network threats to be identified in real-time or near-real-time.

As discussed above, NIC cards can have 64 core independent FPGA or ASIC chipsets and come with a min 256 gig or 512 gig of memory per NIC, each NIC card provides line-rate throughput with 100% lossless packet capture and injection for all Ethernet packet sizes. Each card can be developed to reduce latency by using a packet capture mechanism that adapts to various incoming packet rates such that packets can be received within a couple of microseconds. Because the cards are designed to use partitioning, duplication, and process sharing for enhanced multi-core awareness (done by partitioning incoming flows across integrated the 64 core FPGA CPU chipsets), this design creates simplicity and frees the processing time constraints under high packet loads for applications performing deep packet inspection (DPI). The NICs can duplicate incoming packets into multiple receive rings so that multiple the FPGA CPU 64 cores can concurrently apply different semantic query on the same dataset or packet collection. The NIC cards are programmed to auto-timestamps all incoming packets as well all newly detected datasets to reflect actual packet/data arrival or collection time.

NIC cards can be customized to integrate directly and share logic the HPC's individual blade 4 independent GPU processors that allocate and compress incoming packets and decompile data patterns into byte size DNA contextual language which the main A.I. interpreter engine uses to determine meaning then stores for future logic regression. (The main A.I. interpreter is a cluster of 6 customized ASICS 64 chipsets that decompress and resolve for context). NIC cards are integrated to support the processing chipset, ranging from ASIC, FPGA, or standalone GPU, depending on the data flow context or data type. NIC cards ranging from the standard optional 40 gigabit QDR InfiniBand, 56 gigabit FDR InfiniBand, to dual 56 gigabit FDR InfiniBand option which pull or push data flow into the processor chipset for data flow byte information meaning. The NIC card works unanimously with the processing chipset (GPU, ASIC, or FPGA) to provide intelligent data flow inspection for data bytes fitting malware characteristics at the speed of 40 gigabit QDR InfiniBand, 56 gigabit FDR InfiniBand, to dual 56 gigabit FDR InfiniBand.

Figure 8:
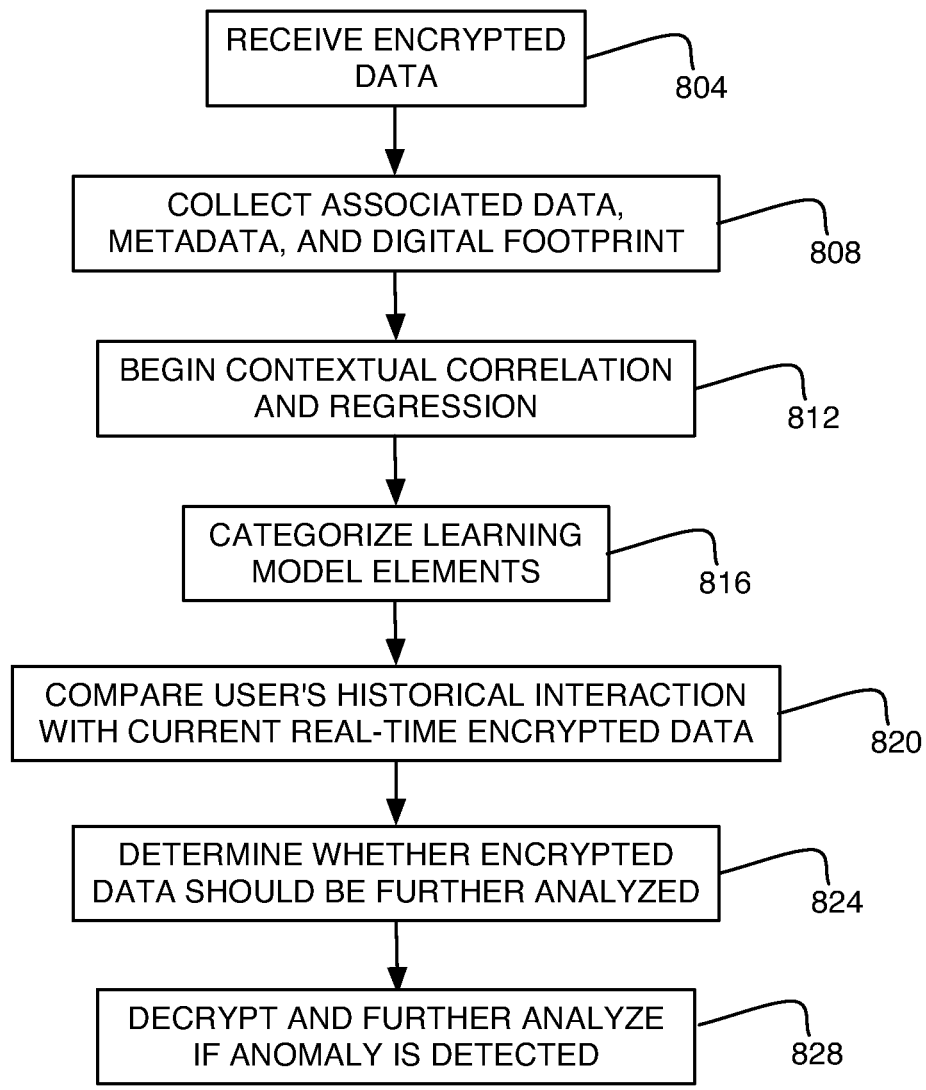
FIG. 8 is a flow chart depicting a method of processing encrypted data in accordance with embodiments of the present disclosure.

With reference now to FIG. 8, a method of analyzing encrypted, decrypted, free forming data will be described in accordance with embodiments of the present disclosure. As discussed above, the proactive security mechanism 108 may be provided with the ability to quickly analyze threats in encrypted or unencrypted form. The diagram of FIG. 8 depicts the special method that can be used to expedite processing of encrypted data received at the proactive security mechanism 108. In particular, the method begins when encrypted data is received at the proactive security mechanism 108 (step 804). As an example, the encrypted data may be gathered by sentinel 220 for analysis by ANNI 232.

Upon receiving the encrypted data, the proactive security mechanism 108 continues by collecting associated data, metadata, and digital footprints that are determined to be associated with the received encrypted data (step 808). In particular, the proactive security mechanism 108 may attempt to find all normal data that has similarities with the received encrypted data (e.g., any data, metadata, or the like that has a common destination as the encrypted data, a common sender as the encrypted data, utilizes a common application as the encrypted data, has a common TTL as the encrypted data, or any other similar feature to the encrypted data). The data is collected to give meaning to the why, how, what, who, from, how long, and when. This data is then used to form a database query for analysis. Specifically, ANNI 232 may begin a statistical analysis that includes a contextual correlation and regression. Once a context of normal data has been identified (e.g., by analyzing the data collected in step 808 and determining characteristics associated with that normal or trusted data via a correlation and regression). This step may include ANNI 232 building learning model elements that give meaning to why normal data (e.g., normal data related to the received encrypted data) exists within the environment (step 816). These learning model elements can be built in real-time by ANNI 232 while the encrypted data is maintained within the isolation hypervisor 228.

The learning model element may then be categorized by ANNI 232 such that they can be compared to the encrypted data (step 820). More specifically, ANNI 232 may correlate and regress how the encrypted data is being used, created, sent, etc. into the prediction models built with the normal/trusted data to understand the difference between how the encrypted data should be handed as compared to the historical data found. Even more specifically, ANNI 232 can look for clues as to how the encrypted data will be handled by applications and/or how the encrypted data was handled by users as compared to normal data. If the encrypted data is being treated similarly to normal data, then ANNI 232 may determine that the encrypted data is not potential malware. For instance, if the TTL, sender, and recipient of the encrypted data match patterns within the normal/trusted data, then ANNI 232 may allow the encrypted data to continue to its actual destination without further processing. Since the process of steps 808 thru 820 can be completed relatively quickly with the HPC described above, it should be appreciated that the delay in transmission of the encrypted data to its actual destination is relatively minimal and almost negligible.

If, however, the received encrypted data has very few occurrences or similarities to normal data, then the encrypted data will get identified as needing further analysis (step 824). Such data will then be decrypted within the isolation hypervisor 228 so that it can be executed within a safe environment (step 828). As a non-limiting example, if the received encrypted data has similarities to data sets identified as normal (e.g., common sender, common recipients, common TTL, etc.), then the encrypted data can be identified as normal and allowed to continue without further processing and/or decryption. Thus, normal data can be processed by ANNI 232 without decryption. Abnormal encrypted data or encrypted data that does not possess enough similarities with trusted data will be decrypted and further processed to determine if it poses a threat to the computing network. Thus, ANNI 232 does not require full decryption of the entire collection of encrypted data sets within the computing network. After ANNI 232 utilizes regressive context learning of the normal data, user interaction is then correlated for meaning ANNI 232 can then search for what the normal conduct is expected to be for the encrypted data. This helps ANNI 232 identify encrypted data anomalies then send an alert to a system administrator for further review or submit the encrypted data packet to the HPC for automated brute force decryption and best-practice evaluation of the encrypted data.

Additional embodiments contemplate the ability to take the ANNI data traffic inspection framework using GPU and divide the framework into subsystems or components.

The ANNI 232 Data Traffic Inspection Framework design may include the following:

DataCollector (Sentinel): in charge of obtaining network packets and buffering them into Anni DNA or Context DNA objects.

Main Anni Logical Cluster: obtaining the Anni DNA or Context DNA objects from DataCollector (Sentinel) and distributing them to all the Regression A.I. Cluster components.

Regression A.I. Cluster: performing regression calculations over the data contained in the Anni DNA or Context DNA objects. These also perform actions depending on the results obtained from the regression calculations.

The Anni Data Traffic Inspection framework, in some embodiments, requires that the program main( ) function contain the addition of new regression and DataCollector (Sentinel) components to the Main Anni Logical Cluster component, prior to start the Regression A.I. Cluster process.

As a non-limiting example:

```
main(){
    // Add as much Regression A.I. Cluster components as desired
    Main Anni Logical Cluster.addRegression A.I. Cluster(Regression
        A.I. Cluster1);
    Main Anni Logical Cluster.addRegression A.I. Cluster(Regression
        A.I. Cluster2);
    // ...
    Main Anni Logical Cluster.addRegression A.I. Cluster(Regression
        A.I. ClusterN);
}
// Add as much PacketFeeeder components as desired
Main Anni Logical Cluster.addFeeder(Anni DNA or Context DNA1);
Main Anni Logical Cluster.addFeeder(Anni DNA or Context DNA2);
// ...
Main Anni Logical Cluster.addFeeder(Anni DNA or Context DNAM);
//Start obtaining packets and analyzing
Main Anni Logical Cluster.start( )
DataCollector (Sentinel).
```

The Anni Data Traffic Inspection framework, in some embodiments, defines DataCollector (Sentinel) as the components in charge of obtaining network packets and packing them into a Anni DNA or Context DNA class object.

The Anni DNA or Context DNA class should define an array of MAX BUFFER PACKETS packets, in which raw network data, basically network headers, are stored. The size of each packet buffer should be fixed to MAX BUFFER PACKET SIZE bytes, to easily be accessed by GPU threads as a function of the thread id. The figure below outlines the basic structure of the Anni DNA or Context DNA class.

As a non-limiting example:

```
typedef struct{
        uint8_t data[MAX_BUFFER_PACKET_SIZE];
    }packet;
    class Anni DNA or Context DNA {
        packet buffer[MAX_BUFFER_PACKETS];
    }
```

DataCollector (Sentinel) may obtain packets from any kind of source and pack them into Anni DNA or Context DNA objects. The framework, as previously said in the objectives, should allow at least:

Obtain packets from network interfaces in real-time. This capability will allow the framework to perform any kind of real-time traffic Regression A.I. Cluster, like monitoring, management or security surveillance tasks.

Obtain packets from a tcpdump capture file, or from any other source. This feature will allow framework users to perform forensics Regression A.I. Cluster (or even batched Regression A.I. Cluster), to, for instance, obtain information after a security attack has been perpetrated.

From the design point Anni DNA or Context DNA objects, regardless of its packet source, should indeed implement the same abstract class or interface. The interface should have at least the method getSniffedAnni DNA or Context DNA( ) where Sentinel supplies a filled Anni DNA or Context DNA object, as shown in the following figure.

This component, and specifically the classes created that inherit from the abstract class Anni DNA or Context DNA, are going to use the Libpcap library for obtaining packets from a network card or a file.

As a non-limiting example:

```
abstract class Anni DNA or Context DNA{
    Anni DNA or Context DNA getSniffedAnni DNA or Context
        DNA(void);
}
```

The Main Anni Logical Cluster component has been used in the development process for debugging purposes, and specifically to debug Anni DNA or Context DNA components and to obtain useful information over the network capture files that have been used.

The Main Anni Logical Cluster acts as a distributor or hub of the Anni DNA or Context DNA objects filled by Sentinel collection and all the Regression A.I. Cluster of the framework-based program. This component provides the flexibility to the framework, in terms of easy inclusion of new Anni DNA or Context DNA and Regression A.I. Cluster components to the framework-based program.

The framework allows other Anni Clusters to use outside or existing Anni DNA or Context DNA objects databases and use multiple Regression A.I. Cluster components within the same context realm.

Data Buffer retrieving policies may include:
Event oriented buffer retrieving (interruptions). The buffers are retrieved as they are filled, and require an interruption or signaling mechanism to the Main Anni Logical Cluster.
Retrieve buffers sequentially, by obtaining Nbuffers buffers from each Sentinel object contained in the program. A particular case of this, is obtaining a buffer from each feeder sequentially. The drawback of this kind of policy is that packet rates between feeders obtaining packets in real-time should be similar or Regression A.I. Cluster time should be less than capturing time, to avoid packet loss.
Broadcast buffers to all Regression A.I. Cluster components.
Broadcast buffers to only a set of Regression A.I. Cluster components, based on data packets.
Broadcast buffers to only one Regression A.I. Cluster components sequentially. This policy makes no sense with the current design of the framework.
Obtaining buffers sequentially, one by one from each feeder (Nbuffers=1), and broad-casting them to all Regression A.I. Cluster policies.

EXAMPLE

```
//Assuming sequential buffer obtaining policy
//and buffer broadcasting to all Regression A.I. Cluster policy
Main Anni Logical ClusterStart( ){
    while(1){
        //For each feeder in allFeeders
        foreach feeder in allFeeders{
            //Obtain buffer from a Anni DNA or Context DNA
            buffer = feeder.obtainBuffer( );
            //For each Regression A.I. Cluster in allRegression A.I. Cluster
            foreach Regression A.I. Cluster in allRegression A.I. Cluster{
}}
}}
}}
//Analyze buffer
//execute GPU(Regression A.I. Cluster) and CPU(hooks) code
Regression A.I. Cluster.analyze(buffer);
```

In order to transition adding both Regression A.I. Cluster and Anni DNA or Context DNAcomponents, the design of Main Anni Logical Cluster static class has two methods; addRegression A.I. ClusterToPool( ... ) and the addFeederToPool( ... ).

As a non-limiting example:

```
class Main Anni Logical Cluster {
    //Add Anni DNA or Context DNAto Main Anni Logical Cluster
        feeders pool
    addFeederToPool(Anni DNA or Context DNAfeeder);
    //Add Regression A.I. Cluster component to Main Anni
        Logical Cluster
```

```
Regression A.I. Cluster pool
        addRegression A.I. ClusterToPool(Regression A.I. Cluster
        Regression A.I.
Cluster);
        //Start Main Anni Logical Cluster loop
        Main Anni Logical Cluster Start( );
    }
```

Regression A.I. Cluster components are the main components of the inspection framework. Regression A.I. Cluster should be objects performing a specific calculation or Regression A.I. Cluster over the network data buffered, inside the GPU using CUDA.

The Regression A.I. Cluster components design should accomplish the following features and design demands:

Easy addition of new Regression A.I. Cluster components to the Main Anni Logical Cluster component.

Each Regression A.I. Cluster, has to be a unique entity in the whole framework-based program, performing a particular Regression A.I. Cluster task.

Each Regression A.I. Cluster component has to include the GPU Regression A.I. Cluster code (CUDA code) and the actions to be done over the Regression A.I. Cluster results, (C++ CPU code).

The code of the Regression A.I. Cluster and hooks section should be easily reused in other Regression A.I. Cluster entities, in the form of libraries or modules. Regression A.I. Cluster components, therefore, should be unique objects or "static classes" in the whole framework-based program. To ease adding Regression A.I. Cluster to the Main Anni Logical Cluster, all Regression A.I. Cluster should have the same entry point or method; launchRegression A.I. Cluster( . . . ).

The design of the Regression A.I. Cluster is divided in two different sections: the Regression A.I. Cluster code section, containing CUDA code, and the actions or hooks code section, containing CPU code.

Functions:

mining( ) This function is defined as the routine in charge of obtaining the data needed by the Regression A.I. Cluster function from the network packets contained in the buffer, and place it into the Regression A.I. Cluster input data array. preRegression A.I. ClusterFiltering( ) The pre-Regression A.I. Cluster filtering function is intended to contain code filtering the Regression A.I. Cluster input data array of the Regression A.I. Cluster( ) function. This function might filter data by other criterias rather than the ones used in the mining( ) function.

Regression A.I. Cluster( ) The Regression A.I. Cluster function must contain the Regression A.I. Cluster algorithms, taking as algorithms input data the input data array and placing the results into a results array. In general, the data-type of the input and output array may be different, as well as the number of results.

postRegression A.I. ClusterOperations( ).

The operations or hooks section, in the form of the hooks( ) function, is defined as the function obtained from the GPU Regression A.I. Cluster. C/C++ code, external libraries, like unixODBC library, and in general any other programming tool that may be of interest should be used within hooks( ) function, in contrast of the Regression A.I. Cluster section.

As a non-limiting example:

```
abstract class Regression A.I. Cluster {
    /*
        User must implement:
        1. Regression A.I. Cluster section (kernel) functions
        2. hooks( ) function
    */
        //CUDA Regression A.I. Cluster main function (kernel)
    global___ kernel(Anni DNA or Context DNA buffer, OUTPUT_TYPE
    results){
        mining(...);
        preRegression A.I. ClusterFiltering(...);
        Regression A.I. Cluster(...);
        postRegression A.I. ClusterOperations(...);
    }
        //Regression A.I. Cluster launch function
        launchRegression A.I. Cluster(Anni DNA or Context DNA buffer){
        }}
//Regression A.I. Cluster section: call GPU functions
kernel<<<gridSize,blockSize>>>(buffer,results);
//Hooks section
hooks(buffer,results);
```

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA or ASICS). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
    proactively monitoring network traffic activity of a networked computing device within a protected domain in real-time, using a hardware processor;
    in response to monitoring the network traffic activity of the networked computing device, determining that potential malware has been received at the networked computing device; and
    in response to determining that potential malware has been received at the networked computing device, moving the potential malware from the networked computing device into an isolation hypervisor for analysis, wherein the analysis is performed during system interrupts by an Analytical Neural Network Interface (ANNI) enabling the ANNI to execute additional computations even though other networked computing devices of the protected domain are not executing any code.

2. The method of claim 1, wherein the isolation hypervisor comprises a virtual machine that enables the potential malware to be safely booted within a virtual environment such that it can be decompiled for forensics.

3. The method of claim 2, further comprising:
    decompiling the potential malware within the isolation hypervisor;
    determining that the potential malware corresponds to actual malware;
    determining a signature unique to the actual malware; and
    storing the signature unique to the actual malware such that the signature unique to the actual malware is available for analysis at all computing devices connected to a protected domain.

4. The method of claim 3, further comprising:
    tracing a route path of the actual malware; and
    determining a source of the actual malware.

5. The method of claim 1, wherein proactively monitoring network traffic activity of the networked computing device in real-time comprise analyzing at least one of the following: contents of one or more packets received at the networked computing device; contents of one or more packet fragments received at the networked computing device; contents of one or more packet headers received at the networked computing device; and routines being executed by the networked computing device.

6. The method of claim 5, further comprising:
    monitoring user behavior at the networked computing device in addition to monitoring network traffic activity at the networked computing device.

7. The method of claim 1, wherein the Analytical Neural Network Interface (ANNI) is used to at least one of monitor activity at the networked computing device, determine that the potential malware has been received at the networked computing device, and place the potential malware into the hypervisor.

8. The method of claim 7, wherein the ANNI is used to analyze the potential malware in the isolation hypervisor.

9. The method of claim 7, wherein the ANNI is executed in at least one of a Central Processing Unit (CPU), Graphics Processing Unit (GPU), and Accelerated Processing Unit (APU).

10. The method of claim 1, further comprising:
    deploying sensors at one or more facilities outside of the protected domain;
    analyzing, via the deployed sensors, at least one of behavioral and hacking trends; and
    based on the analysis at the deployed sensors, creating one or more countermeasures for execution within the protected domain in response to the at least one of behavioral and hacking trends.

11. A non-transitory computer-readable medium comprising processor-executable instructions that, when executed by a microprocessor, perform a method, the method comprising:
    proactively monitoring network traffic activity of a networked computing device within a protected domain in real-time;
    in response to monitoring the network traffic activity of the networked computing device, determining that potential malware has been received at the networked computing device; and
    in response to determining that potential malware has been received at the networked computing device, moving the potential malware from the networked computing device into an isolation hypervisor for analysis, wherein the analysis is performed during system interrupts by an Analytical Neural Network Interface (ANNI) enabling the ANNI to execute additional computations even though other networked computing devices of the protected domain are not executing any code.

12. The non-transitory computer-readable medium of claim 11, wherein the isolation hypervisor comprises a virtual machine that enables the potential malware to be safely booted within a virtual environment such that it can be decompiled for forensics.

13. The non-transitory computer-readable medium of claim 12, wherein the method further comprises:
    decompiling the potential malware within the isolation hypervisor;
    determining that the potential malware corresponds to actual malware;
    determining a signature unique to the actual malware; and
    storing the signature unique to the actual malware such that the signature unique to the actual malware is available for analysis at all computing devices connected to a protected domain.

14. The non-transitory computer-readable medium of claim 13, wherein the method further comprises:
    tracing a route path of the actual malware; and
    determining a source of the actual malware.

15. The non-transitory computer-readable medium of claim 11, wherein proactively monitoring network traffic activity of the networked computing device in real-time comprise analyzing at least one of the following: contents of one or more packets received at the networked computing device; contents of one or more packet fragments received at the networked computing device; contents of one or more packet headers received at the networked computing device; and routines being executed by the networked computing device.

16. The non-transitory computer-readable medium of claim 11, wherein the Analytical Neural Network Interface (ANNI) is used to at least one of monitor activity at the networked computing device, determine that the potential malware has been received at the networked computing device, and place the potential malware into the isolation hypervisor.

17. The non-transitory computer-readable medium of claim 16, wherein the ANNI is used to analyze the potential malware in the isolation hypervisor.

18. The non-transitory computer-readable medium of claim 16, wherein the ANNI is executed in at least one of a Central Processing Unit (CPU), Graphics Processing Unit (GPU), and Accelerated Processing Unit (APU).

* * * * *